(12) United States Patent
Imade et al.

(10) Patent No.: US 7,322,705 B2
(45) Date of Patent: Jan. 29, 2008

(54) ILLUMINATION APPARATUS, AND IMAGE CAPTURING APPARATUS AND PROJECTOR APPARATUS USING THIS ILLUMINATION APPARATUS

(75) Inventors: Shinichi Imade, Iruma (JP); Shinzo Matsui, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/522,707

(22) Filed: Sep. 18, 2006

(65) Prior Publication Data

US 2007/0013879 A1 Jan. 18, 2007

Related U.S. Application Data

(63) Continuation of application No. 10/994,131, filed on Nov. 19, 2004, now Pat. No. 7,128,423, which is a continuation of application No. PCT/JP03/06211, filed on May 19, 2003.

(30) Foreign Application Priority Data

May 24, 2002 (JP) .............................. 2002-151038

(51) Int. Cl.
*G03B 21/14* (2006.01)
(52) U.S. Cl. .......................... 353/94; 362/231; 396/109
(58) Field of Classification Search ................. 353/94, 353/122; 362/12, 227, 231, 232, 800; 396/108, 396/109, 106, 107, 182, 195; 345/31, 33, 345/44, 45, 46, 82, 108, 110
See application file for complete search history.

(56) References Cited

U.S. PATENT DOCUMENTS

| 6,227,669 | B1 | 5/2001 | Tiao et al. | |
| 6,749,310 | B2 * | 6/2004 | Pohlert et al. | 362/11 |
| 6,889,435 | B1 | 5/2005 | King et al. | |
| 6,909,377 | B2 * | 6/2005 | Eberl | 340/815.4 |
| 7,128,423 | B2 * | 10/2006 | Imade et al. | 353/94 |
| 2002/0080834 | A1 | 6/2002 | Kusunose | |
| 2002/0196377 | A1 | 12/2002 | Furukawa et al. | |
| 2003/0076057 | A1 | 4/2003 | Fluery | |
| 2004/0090602 | A1 | 5/2004 | Imade | |

FOREIGN PATENT DOCUMENTS

| EP | 1146379 A1 | 10/2001 |
| JP | 61-97831 | 5/1986 |
| JP | 6-227312 | 8/1994 |

(Continued)

*Primary Examiner*—William C. Dowling
(74) *Attorney, Agent, or Firm*—Volpe & Koenig PC

(57) ABSTRACT

An illumination apparatus comprises a plurality of luminous bodies as light sources, luminous body drive portions configured to drive to light each of the plurality of luminous bodies, an optical member configured to lead and apply light exiting from a luminous body lighted by the luminous body drive portion to an illumination target area, a light control member configured to perform change of a light path of the light exiting from the luminous body with which the illumination target area is illuminated and/or movement of the luminous body, a movable portion configured to operably drive the light control member, and a light selection portion configured to control the movable portion and/or the luminous body drive portion in such a manner that light with which the illumination target area is selected from light exiting from the plurality of luminous bodies.

5 Claims, 11 Drawing Sheets

FOREIGN PATENT DOCUMENTS

| | | |
|---|---|---|
| JP | 08-28543 | 3/1996 |
| JP | 09-61633 | 3/1997 |
| JP | 09-274471 | 10/1997 |
| JP | 10-49074 A | 2/1998 |
| JP | 10-293233 | 11/1998 |
| JP | 10-333588 | 12/1998 |
| JP | 11-032278 | 2/1999 |
| JP | 11-352589 | 12/1999 |
| JP | 2000-141745 | 5/2000 |
| JP | 2000-294491 | 10/2000 |
| JP | 2000-331520 | 11/2000 |
| JP | 2000-356757 A | 12/2000 |
| JP | 2001-111826 A | 4/2001 |
| JP | 2001-209342 A | 8/2001 |
| JP | 2002-116481 A | 4/2002 |
| JP | 2003-208991 | 7/2003 |
| WO | 01/36864 A2 | 5/2001 |
| WO | WO02/01921 * | 1/2002 |

* cited by examiner

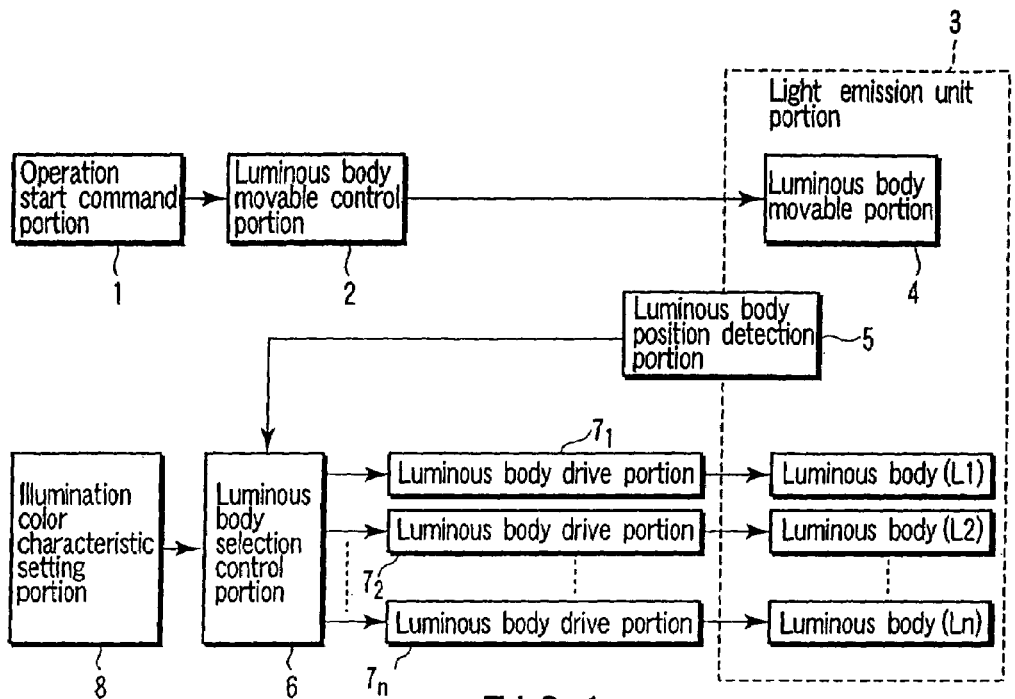
FIG. 1
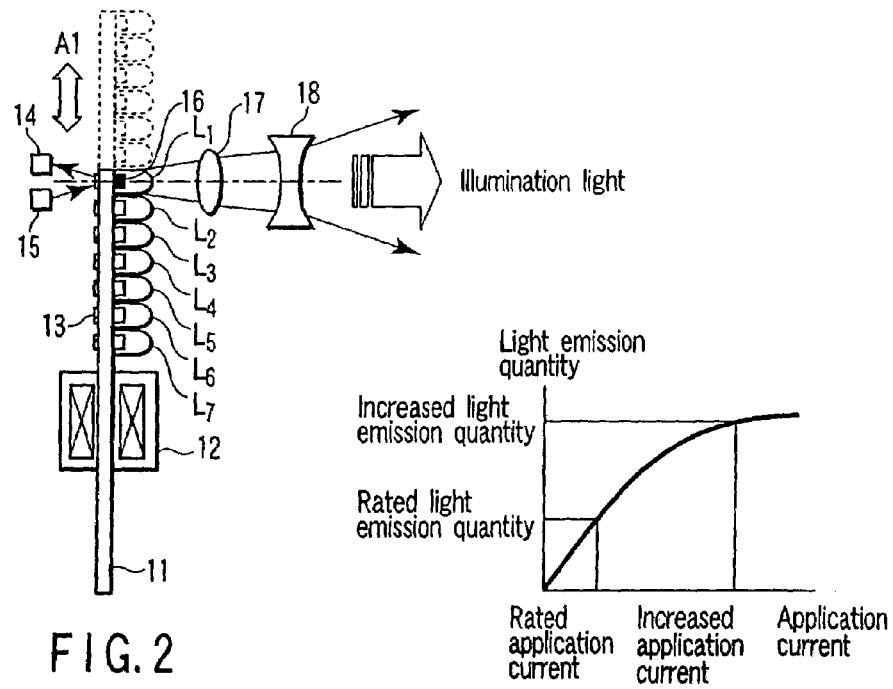
FIG. 2
FIG. 3

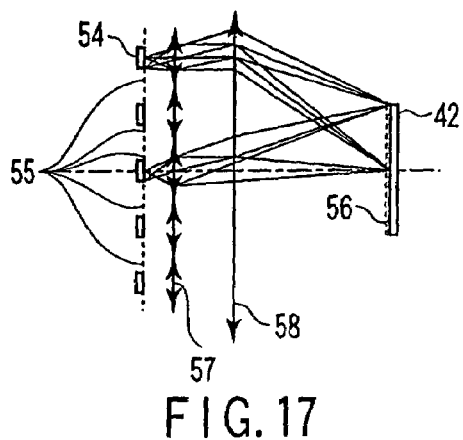
F I G. 17
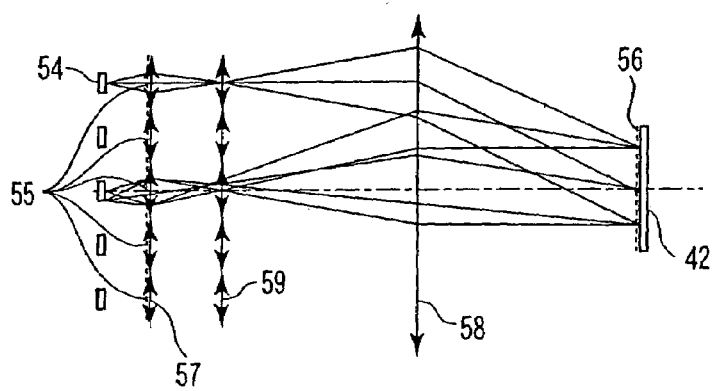
F I G. 18
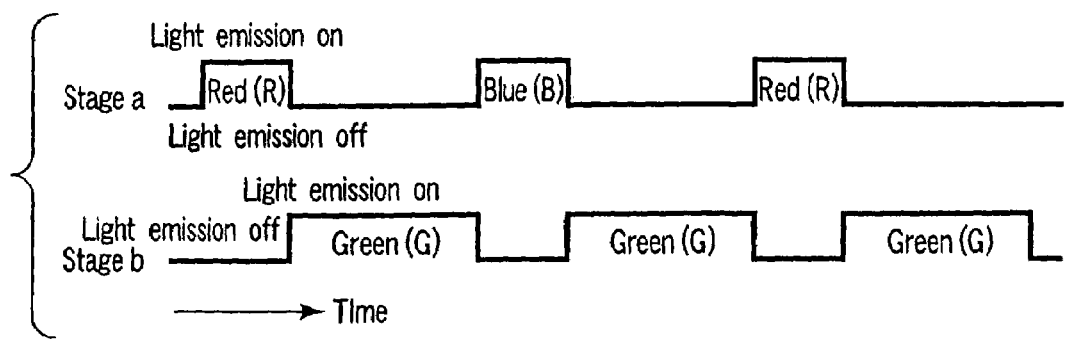
F I G. 23

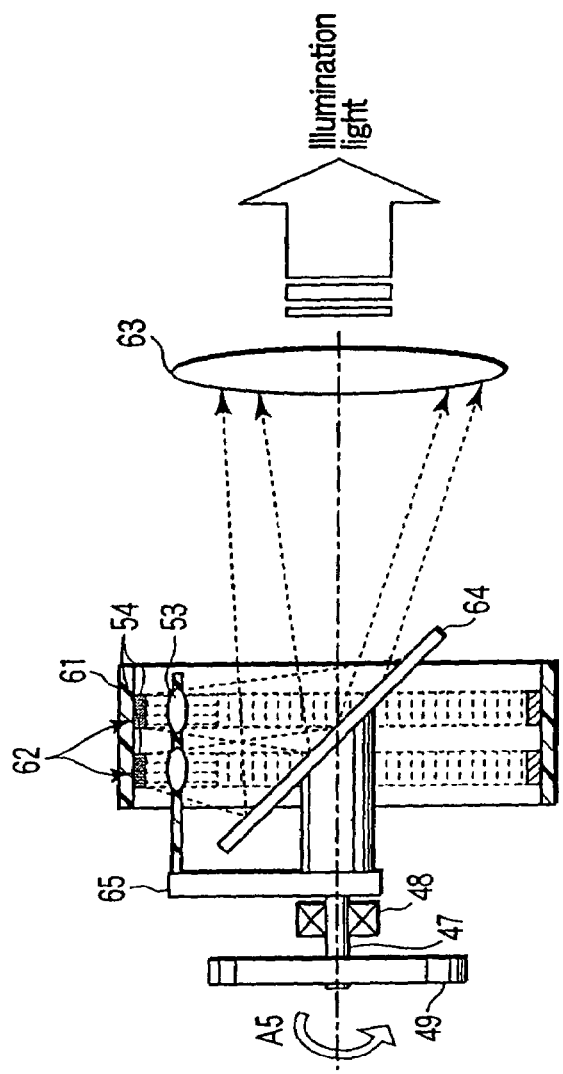
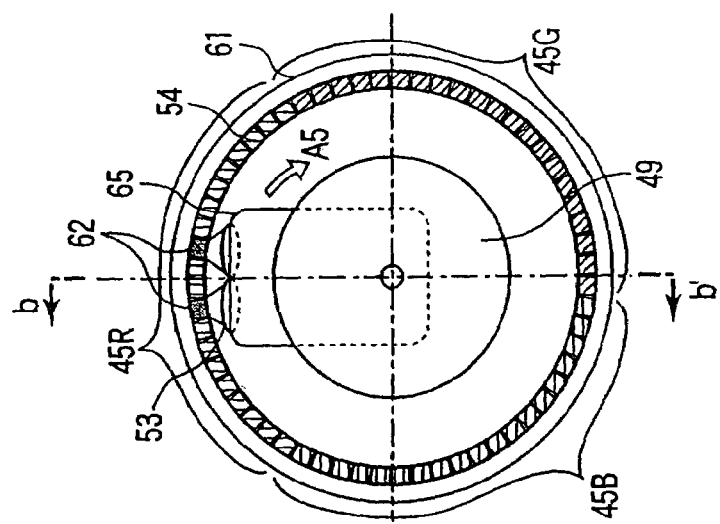
FIG. 20B
FIG. 20A

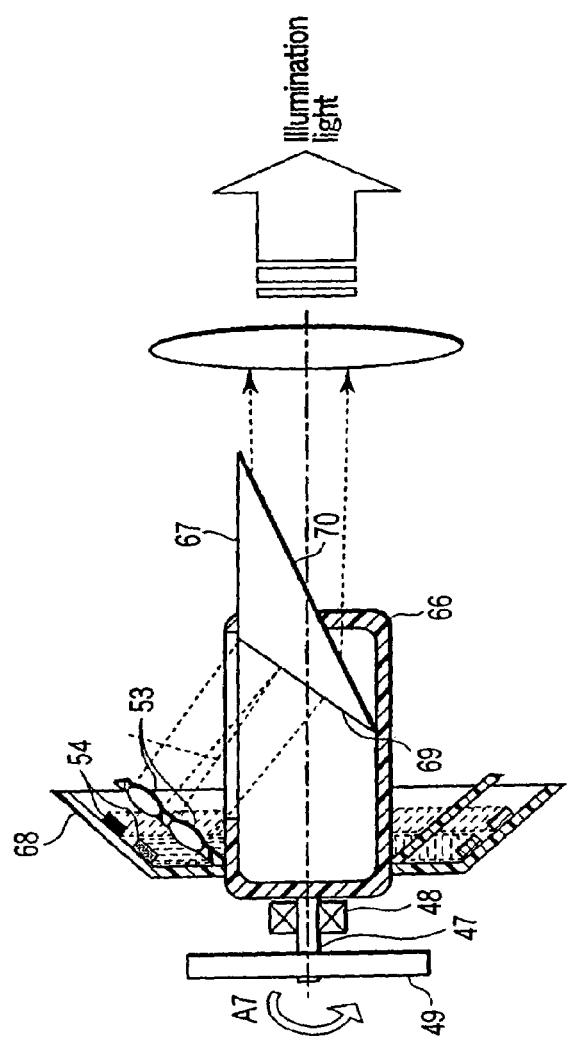
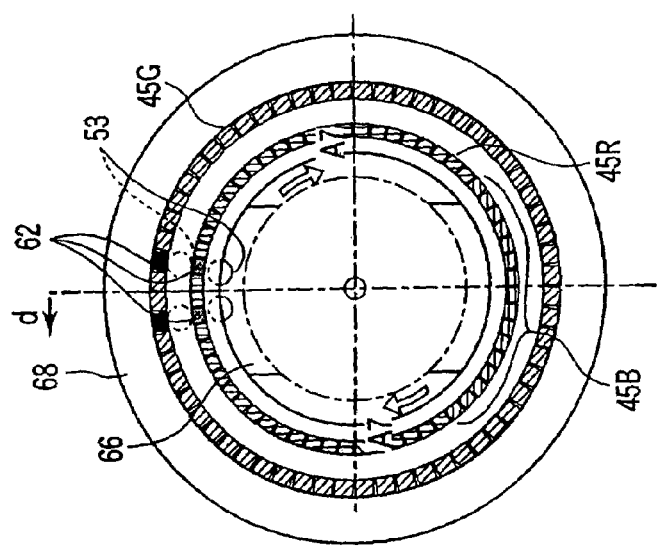
FIG. 22B
FIG. 22A

ILLUMINATION APPARATUS, AND IMAGE CAPTURING APPARATUS AND PROJECTOR APPARATUS USING THIS ILLUMINATION APPARATUS

CROSS REFERENCE TO RELATED APPLICATIONS

This application is a continuation of U.S. patent application Ser. No. 10/994,131, filed on Nov. 19, 2004, now U.S. Pat. No. 7,128,423, which is a continuation of International Patent Application No. PCT/JP03/06211, filed May 19, 2003, which was published under PCT Article 21(2) in Japanese, the entire contents of which are incorporated by reference as if fully set forth.

This application is based upon and claims the benefit of priority from prior Japanese Patent Application No. 2002-151038, filed May 24, 2002, the entire contents of which are incorporated herein by reference.

BACKGROUND OF THE INVENTION

1. Field of the Invention

The present invention relates to an illumination apparatus which has a high condensing performance and realizes a high luminance and a reduction in size, and an image capturing apparatus and a projector apparatus using this illumination apparatus.

2. Description of the Related Art

As a condensing illumination apparatus which efficiently illuminates a specific position, there are, e.g., a care headlight, a stand illumination, a spot light, a flashlight, an illumination unit for a data projector and others. A conventional condensing illumination apparatus is usually intended to perform illumination with a high condensing performance by a relatively simple method. That is, light from a light emission source relatively closer to a point light source is reflected by a reflection unit with an ingenious reflection shape. Further, the reflected light is condensed on an optical lens or the like. The directivity of light rays is thus enhanced.

Although this can be also applied to general illumination, a demand for acquisition of brighter illumination light without increasing sizes of apparatuses is high in these condensing illumination apparatuses. In general, however, although the size of a light emission source is increased in order to obtain brighter illumination light, applied power of the light emission source is increased to enhance output. Furthermore, at the same time, a reflection unit or an optical lens which is relatively enlarged with respect to a light emission source is applied in order to increase the condensing performance. Therefore, the size of the illumination apparatus is necessarily increased with respect to the light emission source in order to obtain the brightness with the excellent condensing efficiency. In other words, provision of a small light emission source which has a high output and approximates a point light source enables a reduction in size of the entire illumination apparatus. Based on such a demand, a reduction in size of the light emission source has been advanced even in a conventional mode, and a small light emission source which is of a discharge type enabling a high output is current key means. However, even in case of a small discharge type light emission source, there are many problems with respect to a reduction in size as an entire illumination apparatus. For example, driving by a high-voltage power source whose circuit scale is hard to be reduced is required. In regard to a reduction in size of the illumination apparatus using a small discharge type light emission source, it is said that such a reduction has substantially got close to its limit.

In contrast, as a small light emission source for coming generation, a light emitting diode (which will be abbreviated as an LED hereinafter) has attracted the considerable attention. When it comes to the LED, although it has advantages such as a small size, high-resistance characteristics, a long duration of life and others, it has a limit in its light emission efficiency and a light emission output. Therefore, the LED has been mainly applied as an indicator illumination for various kinds of measuring gauges or a control state confirmation lamp. In recent years, however, the light emission efficiency has been rapidly improved. It is said that it is a matter of time before exceeding the light emission efficiency of a discharge type high pressure mercury lamp or a fluorescent lamp which is conventionally considered that it has the highest efficiency. With emergence of this high-efficiency high-luminance LED, a high-output light emission source using the LED has rapidly serves practical use. Moreover, in recent years, the fact that a blue LED as well as conventional red and green LEDs has advanced to the practical stage accelerates its application. In fact, using the plurality of high-efficiency high-luminance LEDs has started practical applications to traffic lights, an outdoor type large full-color display, various kinds of lamps for a vehicle and a backlight of a liquid crystal display in a mobile phone which are conventionally impossible due to the brightness or the efficiency.

As a promising small light emission source of an illumination apparatus in which the condensing performance is demanded, an application of this high-efficiency high-luminance LED has been considered. The LED basically has characteristics superior to other light emission sources in a life duration, the durability, a lighting speed and the simplicity of a lighting drive circuit. Additionally, the fact that blue is added and three primary colors are provided for the light emission source of spontaneous light has enlarged an application range as a full-color image display apparatus. As a typical example of an illumination apparatus in which the condensing performance is demanded, there is, e.g., a projector display apparatus which forms a display image from image data and projects this image. This projector display apparatus conventionally separates a desired primary color from light from a white color type light emission source by using a color filter or the like, performs spatial light modulation with respect to image data corresponding to each color and spatially or temporally combines the modulated data, thereby enabling color image display. When a white color type light emission source is used, since a desired one color is separated and utilized, it is often the is case that other colors than the separated color are uselessly wasted. However, the LED emits light of a desired color itself, it can emit a necessary quantity of light when the need arises. Therefore, light of the light emission source can be efficiently utilized without wasting the light as compared with the conventional white color type light emission source.

Paying notice to excellent application conditions of such an LED, examples in which the LED is applied in an illumination apparatus for a projector display apparatus are disclosed in, e.g., Jpn. Pat. Applin. KOKAI Publication No. 11-32278, U.S. Pat. No. 6,227,669 B1 and others. In the technique disclosed in these publications, a light quantity is assured by constituting a plurality of LEDs. Further, light beams from individual light emission sources are partially condensed by an optical element such as an optical lens, and a light modulation element to be irradiated performs a light beam control in such a manner that these light beams can be successfully set within an allowed incident angle. In general, a widely used light modulation element such as a liquid crystal device has a very small incident angle allowed as illumination light. It is, therefore, ideal to not only provide the simple condensing performance but also form light beams with the higher parallelism and use them for irradiation. This is a very important point when increasing the light utilization efficiency in the light modulation element.

BRIEF SUMMARY OF THE INVENTION

According to a first aspect of the present invention, there is provided an illumination apparatus which illuminates an illumination target area with light from light sources, comprising:

a plurality of luminous bodies which are the light sources;
luminous body drive portions configured to drive to light each of the plurality of luminous bodies;
an optical member configured to lead and apply light exiting from a luminous body lighted by the luminous body drive portion to the illumination target area;
a light control member configured to perform at least one of change of a light path of a light exiting from the luminous body with which the illumination target area is illuminated and relative movement of the plurality of luminous bodies and the optical member;
a movable portion configured to operably drive the light control member; and
a light selection control portion configured to control at least one of the movable portion and the luminous body drive portions in such a manner that the light with which the illumination target area is illuminated is selected from the light exiting from the plurality of luminous bodies,
wherein the plurality of luminous bodies comprise at least the plurality of luminous bodies which emit light having one type of color, and
the luminous body drive portions cause the plurality of luminous bodies to emit the light having one type of color with which the illumination target area is illuminated by driving to sequentially light each of the plurality of luminous bodies in synchronization with a timing of controlling at least one of the movable portion and the luminous body drive portion by the light selection control portion.

According to a second aspect of the present invention, there is provided an image capturing apparatus which captures an image of a subject, comprising:
an illumination apparatus including:
a plurality of luminous bodies which are the light sources;
luminous body drive portions configured to drive to light each of the plurality of luminous bodies;
an optical member configured to lead and apply light exiting from a luminous body lighted by the luminous body drive portion to the illumination target area;
a light control member configured to perform at least one of change of a light path of a light exiting from the luminous body with which the illumination target area is illuminated and relative movement of the plurality of luminous bodies and the optical member;
a movable portion configured to operably drive the light control member; and
a light selection control portion configured to control at least one of the movable portion and the luminous body drive portions in such a manner that the light with which the illumination target area is illuminated is selected from the light exiting from the plurality of luminous bodies;

an imaging optical system configured to form an image of the subject;
an image sensor configured to expose and image the formed image of the subject; and
a shutter button which operates an exposure start timing of the image sensor,
wherein the light selection control portion of the illumination apparatus controls at least one of the movable portion and the luminous body drive portions in such a manner that illumination light is emitted in synchronization with the exposure start timing.

According to a third aspect of the present invention, there is provided a projector apparatus which projects an image corresponding to image information on a projection surface, comprising:
an illumination apparatus including:
a plurality of luminous bodies which are the light sources;
luminous body drive portions configured to drive to light each of the plurality of luminous bodies;
an optical member configured to lead and apply light exiting from a luminous body lighted by the luminous body drive portion to the illumination target area;
a light control member configured to perform at least one of change of a light path of a light exiting from the luminous body with which the illumination target area is illuminated and relative movement of the plurality of luminous bodies and the optical member;
a movable portion configured to operably drive the light control member; and
a light selection control portion configured to control at least one of the movable portion and the luminous body drive portions in such a manner that the light with which the illumination target area is illuminated is selected from the light exiting from the plurality of luminous bodies;
a spatial light modulation element configured to perform one of transmission and reflection by modulating illumination light emitted from the illumination apparatus in accordance with the image information; and
a projection optical system configured to project the light modulated by the spatial light modulation element on the projection surface.

According to a fourth aspect of the present invention, there is provided an illumination apparatus which illuminates an illumination target area with light from light sources, comprising:
a plurality of luminous bodies which are the light sources;
lighting means for driving to light each of the plurality of luminous bodies;
optical means for leading and applying light exiting from a luminous body lighted by the lighting means to the illumination target area;
a light control member for performing at least one of change of a light path of a light exiting from the luminous body with which the illumination target area is illuminated and relative movement of the plurality of luminous bodies and the optical means;
movable means for operably driving the light control member; and
light selection control means for controlling at least one of the movable means and the lighting means in such a manner that the light with which the illumination target area is illuminated is selected from the light exiting from the plurality of luminous bodies,
wherein the plurality of luminous bodies comprise at least the plurality of luminous bodies which emit light having one type of color, and the lighting means causes the plurality of luminous bodies to emit the light having one type of color with which the illumination target area is illuminated by driving to sequentially light each of the plurality of luminous bodies in synchronization with a timing of controlling at least one of the movable means and the lighting means by the light selection control means.

According to a fifth aspect of the present invention, there is provided an image capturing apparatus which captures an image of a subject, comprising:

an illumination apparatus including:
a plurality of luminous bodies which are the light sources;
lighting means for driving to light each of the plurality of luminous bodies;
optical means for leading and applying light exiting from a luminous body lighted by the lighting means to the illumination target area;
a light control member for performing at least one of change of a light path of a light exiting from the luminous body with which the illumination target area is illuminated and relative movement of the plurality of luminous bodies and the optical means;
movable means for operably driving the light control member; and
light selection control means for controlling at least one of the movable means and the lighting means in such a manner that the light with which the illumination target area is illuminated is selected from the light exiting from the plurality of luminous bodies;
imaging optical means for forming an image of the subject;
image sensing means for exposing and imaging the formed image of the subject; and
a shutter button for operating an exposure start timing of the image sensing means,
wherein the light selection control means of the illumination apparatus controls at least one of the movable means and the lighting means in such a manner that illumination light is emitted in synchronization with the exposure start timing.

According to a sixth aspect of the present invention, there is provided a projector apparatus which projects an image corresponding to image information on a projection surface, comprising:

an illumination apparatus including:
a plurality of luminous bodies which are the light sources;
lighting means for driving to light each of the plurality of luminous bodies;
optical means for leading and applying light exiting from a luminous body lighted by the lighting means to the illumination target area;
a light control member for performing at least one of change of a light path of a light exiting from the luminous body with which the illumination target area is illuminated and relative movement of the plurality of luminous bodies and the optical means;
movable means for operably driving the light control member; and
light selection control means for controlling at least one of the movable means and the lighting means in such a manner that the light with which the illumination target area is illuminated is selected from the light exiting from the plurality of luminous bodies;
light modulation means for performing one of transmission and reflection by modulating illumination light emitted from the illumination apparatus in accordance with the image information; and projection optical means for projecting the light modulated by the light modulation means on the projection surface.

According to a seventh aspect of the present invention, there is provided an illumination apparatus which illuminates an illumination target area with light from light sources, comprising:

a plurality of luminous bodies which are the light sources;
luminous body drive portions configured to drive to light each of the plurality of luminous bodies;
an optical member configured to lead and apply light exiting from a luminous body lighted by the luminous body drive portion to the illumination target area;
a light control member configured to perform at least one of change of a light path of the light exiting from the luminous body with which the illumination target area is illuminated and relative movement of the plurality of luminous bodies and the optical member;
a movable portion configured to operably drive the light control member; and
a light selection control portion configured to control at least one of the movable portion and the luminous body drive portions in such a manner that light with which the illumination target area is illuminated is selected from light exiting from the plurality of luminous bodies,
wherein the luminous body drive portions cause the plurality of luminous bodies to emit light with which the illumination target area is illuminated in the form of continuous light emission which is seemingly equivalent to one luminous body by performing lighting driving to cause each of the plurality of luminous bodies to effect sequential pulse light emission and cause successively different luminous bodies to emit light in synchronization with a timing of controlling at least one of the movable portion and the luminous body drive portions by the light selection control portion, and
the luminous body drive portions apply a lighting drive current which is not less than a maximum rated current to each luminous body performing pulse light emission in accordance with an increase in tolerance limit of the luminous body by improvement in heat radiation properties in a non-light emission time involved by pulse light emission.

According to an eighth aspect of the present invention, there is provided an illumination apparatus which illuminates an illumination target area with light from light sources, comprising:

a plurality of luminous bodies which are the light sources;
luminous body drive portions configured to drive to light each of the plurality of luminous bodies;
an optical member configured to lead and apply light exiting from a luminous body lighted by the luminous body drive portion to the illumination target area;
a light control member configured to change a light path of the light exiting from the luminous body with which the illumination target area is illuminated by moving the optical member with respect to the plurality of luminous bodies;
a movable portion configured to operably drive the light control member; and
a light selection control portion configured to control at least one of the movable portion and the luminous body drive portions in such a manner that the light with which the illumination target area is illuminated is selected from light exiting from the plurality of luminous bodies.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a function block diagram showing an illumination apparatus according to a first embodiment of the present invention, illustrating an illumination principle;

FIG. 2 is a view showing a structure of a light emission unit portion;

FIG. 3 is a view showing a relationship between an application current and a light emission quantity of an LED chip in the form of a modeled graph;

FIG. 17 is a view schematically showing an illumination method by which images of the LED chips are formed on a spatial light modulation element as an illumination target;

FIG. 18 is a view showing an example of another illumination method using a plurality of LED chips as light sources;

FIG. 20A is a view showing another modification of the illumination unit as the illumination apparatus according to the third embodiment from behind;

FIG. 20B is a cross-sectional view taken along the line bb' in FIG. 20A;

FIG. 22A is a view showing still another modification of the illumination unit as the illumination apparatus according to the third embodiment from behind;

FIG. 22B is a cross-sectional view taken along the line dd' in FIG. 22A;

FIG. 23 is a view illustrating light emission timings of the LED chip in the structure depicted in FIGS. 22A and 22B.

DETAILED DESCRIPTION OF THE INVENTION

Figure 4:
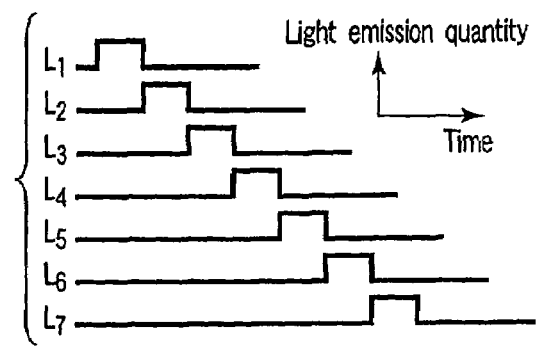
FIG. 4 is a view showing light emission timings of seven LED chips in FIG. 2.

Embodiments according to the present invention will now be described hereinafter with reference to the accompanying drawings.

First Embodiment

A basic illumination principle of an illumination apparatus according to a first embodiment of the present invention will first be described with reference to FIGS. 1 to 10.

An operation start command portion 1 as shown in FIG. 1 outputs a signal which commands start of an illumination operation by an illumination apparatus according to this embodiment. This signal which commands start of the operation is output in cooperation with a non-illustrated trigger switch which is operated by a user in order to start illumination. Alternatively, it may be output in cooperation with another non-illustrated function block which must activate the illumination operation.) The signal output from the operation start command portion 1 is input to a luminous body movable control portion 2.

In contrast, in a light emission unit portion 3, a plurality of luminous bodies $L_1, L_2, \ldots, L_n$ are arranged and configured, and a luminous body movable portion 4 as movable means for mechanically enabling movement of these luminous bodies themselves is constituted. The luminous body movable control portion 2 gives a movement control quantity of each luminous body to this luminous body movable portion 4. The luminous body movable portion 4 spatially moves each luminous body at high speed in accordance with the given control quantity. As the luminous body movable portion 4, one which can perform electrical driving and control such as an electromagnetic motor or an electrostatic motor is realistic, and selecting appropriate means in accordance with demanded conditions can suffice.

Further, a luminous body position detection portion 5 which constitutes a luminous body position detection sensor which is used to know a movement quantity or a movement timing of each luminous body is additionally provided in the vicinity of the luminous bodies. This luminous body position detection portion 5 detects a luminous body which should emit light by detecting a position of the luminous body moved to a specific light emission reference position 16 (refer to FIG. 2), and outputs a signal according to this detection.

The signal output from the luminous body position detection portion 5 is input to a luminous body selection control portion 6. This luminous body selection control portion 6 and the luminous body movable control portion 2 constitute a light selection control portion as light selection controlling means. This luminous body selection control portion 6 selects a luminous body which should be caused to emit light based on the signal input thereto. Then, it outputs a control quantity which gives switching on/off of light emission or a light emission quantity to the selected luminous body. Luminous body drive portions $7_1$, $7_2$, ..., $7_n$ (in this case, the luminous bodies comprise n luminous bodies) as lighting means are constituted in association with the luminous bodies $L_1$, $L_2$, ..., $L_n$. A control quantity output from the luminous body selection control portion 6 is input to any selected one of these luminous body drive portions $7_1$, $7_2$, $7_n$.

Incidentally, in regard to distribution of luminous colors of the luminous bodies $L_1$, $L_2$, ..., $L_n$, the luminous bodies may comprise those which can emit light having different colors. In this case, by enabling the luminous bodies $L_1$, $L_2$, ..., $L_n$ to move at a high speed by the luminous body movable portion 4, e.g., by enabling movement of n luminous bodies at a speed which is not more than 1/60 second, illumination light having mixed luminous colors of these luminous bodies can be created by using an afterglow phenomenon of the visual perception. This perceptible mixed color can be flexibly set based on combinations of luminous colors of the individual luminous bodies or individual light emission quantities. Therefore, in an illumination color characteristic setting portion 8 as illumination color characteristic setting means, a desired mixed color of the illumination light is set, and its information is supplied to the luminous body selection control portion 6. The luminous body selection control portion 6 outputs a control quantity according to the input information. A resort of setting an illumination color in the illumination color characteristic setting portion 8 may be one of mechanical means, an electrical means and software means. Furthermore, a content of the setting may be a direct content, e.g., a desired illumination color, or an indirect content, e.g., setting a light emission quantity with respect to each of the luminous bodies having different luminous colors. It is to be noted that, as the method of setting a mixed color, a method of controlling and changing a light emission time of each of the luminous bodies as well as the above-described method of setting a luminous color or a light emission quantity can be used.

That is, according to the first embodiment, the plurality of luminous bodies are constituted, these luminous bodies move at a high speed, a luminous body placed at a specific position is caused to emit light like a single pulse, and the sequentially different luminous bodies are caused to continuously emit light, thereby obtaining continuous light emission which is equivalent to seemingly one luminous body.

A structure of the light emission unit portion 3 will now be described. It is to be noted that seven high-luminance light emitting diodes (which will be referred to as LED chips hereinafter) are used as the luminous bodies in this example. That is, as shown in FIG. 2, LED chips $L_1$ to $L_7$ are mounted on a support member 11 as light control member at equal intervals. This support member 11 has a mechanism which can slide in a direction indicated by an arrow A1 in the drawing at high speed by a voice coil motor 12 corresponding to the luminous body movable portion 4.

Moreover, seven reflection portions 13 are separately formed on a rear surface of the support member 11 so that they form pairs with the LED chips $L_1$ to $L_7$. These reflection portions 13 as well as a light emitting element 14 and a light receiving element 15 constitute the luminous body position detection portion 5. These reflection portions 13 are fixedly arranged in such a manner that they can reflect light emitted from the light emitting element 14 in a predetermined direction and the reflected light can be received by the light receiving element 15. Therefore, when the reflection portion 13 reaches a predetermined light emission reference position 16 as shown in the drawing, the reflected light is input to the light receiving element 15. Therefore, whether an LED chip forming a pair exists at the light emission reference position 16 can be detected by counting the number of times of reflection from an initial reflection portion. It is to be noted that the light emission reference position 16 is a position at which the LED chip $L_1$ is placed in the illustrated state.

At a position corresponding to light emission front surface of the LED chip placed at the light emission reference position 16, an optical member as optical means which leads and applies light exiting from this LED chip to an illumination target area is arranged. In this embodiment, this optical member comprises an optical lens 17 which condenses light emitted by the LED chip, and an optical lens 18 which controls a light path in such a manner that a desired irradiation target area is irradiated with the light condensed by the optical lens 17. That is, when the support member 11 moves and the LED chip passes the light emission reference position 16, the passing LED chip alone emits light, and this light is applied to the irradiation target area. By sequentially repeating this operation with respect to the LED chips $L_1$ to $L_7$, light emitted from the LED chips $L_1$ to $L_7$ in a given fixed time is applied to the irradiation target area as illumination light which is seemingly continuous light even though this is time-sharing light.

FIG. 3 shows a relationship between an application current and a light emission quantity of the LED chip in the form of a modeled graph. That is, although the LED chip has a predetermined tolerance limit, but it can increase a quantity of emitted light when an application current is increased. The tolerance limit is of course affected and determined by characteristics of a material used, a composition defect, a heat radiation performance, electric conduction characteristics of peripheral electrodes and others. Additionally, by increasing the heat radiation performance in particular without changing these factors, a current which is not smaller than a maximum rating in continuous light can be given, thereby obtaining a large light quantity.

As a method of increasing the heat radiation properties, increasing the thermal conductivity around the chip and radiating heat in a shorter time can be considered. In addition to this, assuring a longer non-light emission time by pulse light emission in a very short time instead of continuous light emission enables light emission suppressing heat radiation. That is, observing in a light emission time only, a larger quantity of current can be applied in a very short time, and light emission is enabled while intensifying the brightness as compared with continuous light emission. Using the illumination principle like this embodiment by utilizing the above-described characteristics can create intensive light which cannot be obtained from the continuous light emission.

FIG. 4 is a timing chart showing light emission timings of the LED chips $L_1$ to $L_7$ described in conjunction with FIG. 2. A horizontal axis represents a time axis, and a vertical axis represents a light emission quantity. As can be understood from FIG. 4, each of the LED chips $L_1$ to $L_7$ is time-shared, and the light emission control is carried out with these time-shared LED chips being continuous.

It is to be noted that the LED chips $L_1$ to $L_7$ move with respect to the optical lenses 17 and 18 in the above description, but the optical lenses 17 and 18 may relatively move with respect to the LED chips $L_1$ to $L_7$. It is needless to say that the same advantages can be obtained even if this structure is adopted.

Figure 5:
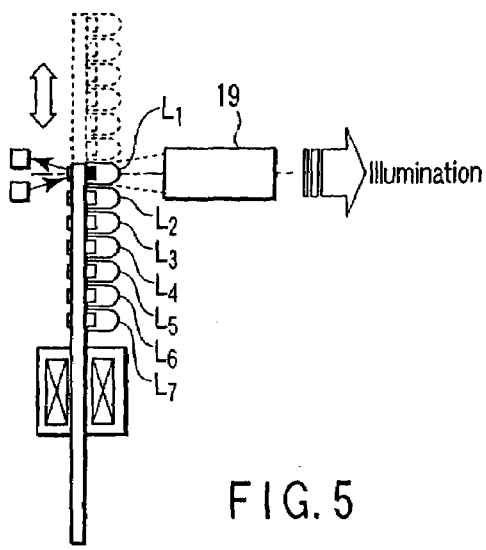
FIG. 5 is a view showing a modification of the light emission unit portion in the first embodiment.

Further, FIG. 5 shows a configuration in which the optical lenses 17 and 18 as the optical members are substituted by one rod lens 19 in the structure depicted in FIG. 2. Even if the rod lens 19 is used in this manner, the optical configuration which is used to obtain the illumination light can be likewise taken.

Figure 6:
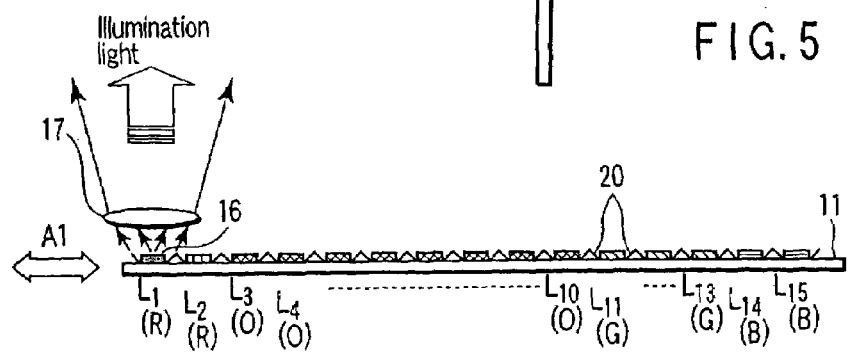
FIG. 6 is a view showing a structure of the light emission unit portion, illustrating an example of a method of toning tints of illumination light.
Figure 7:
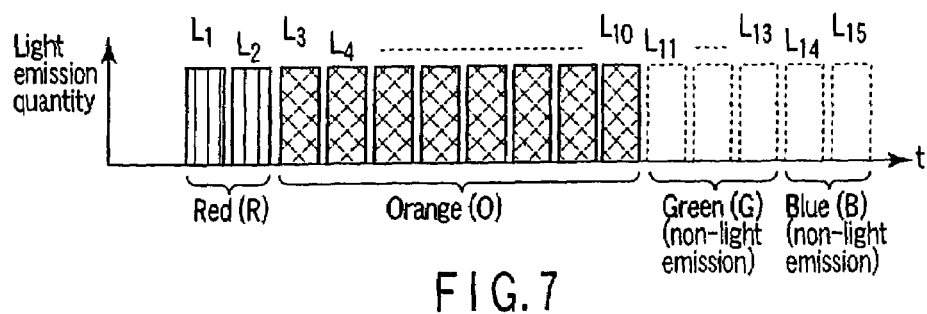
FIG. 7 is a view showing a state of light emission quantities of respective LED chips in accordance with these chips in FIG. 6.

FIGS. 6 and 7 show an example of a method of toning tints of the illumination light by using the illumination principle described in conjunction with FIGS. 2 to 4.

That is, as shown in FIG. 6, 15 LED chips $L_1$ to $L_{15}$ are arranged on the support member 11 at equal intervals. In the illustrated state, a position at which the LED chip $L_1$ is placed is determined as the light emission reference position 16. A condensing optical lens 17 is fixedly arranged in front of this light emission reference position 16 so that the illumination light can be obtained. Furthermore, a reflection surface 20 is constituted on each side of the LED chips in such a manner that the light emitted from side surfaces of the individual LED chips can be effectively applied to the front surface. The support member 11 moves in a direction indicated by an arrow A1 in the drawing at a high speed. The LED chips $L_1$ to $L_2$ are formed of a light emitting material which emits a red (R) color; the LED chips $L_3$ to $L_{10}$, an orange (O) color; the LED chips $L_{11}$ to $L_{13}$, a green (G) color; and the LED chips $L_{14}$ to $L_{15}$, a blue (B) color. It is to be noted that different hatchings are provided in the drawing in order to identify each color, and these are not hatchings indicating cross-sections (this can be also applied to other drawings). Other structures are the same as FIG. 2, and their illustration and description will be eliminated.

FIG. 7 shows a state of light emission quantities of the LED chips $L_1$ to $L_n$ ($L_{15}$ in this example) in accordance with these LED chips. However, the light emission quantity means a quantity of light emitted by the LED chip rather than a voltage and a current applied to the LED chip. In the structure shown in FIG. 6, the LED chips can sequentially emit light in the order of the LED chips $L_1$ to $L_2, \ldots, L_{15}$ with respect to a time axis t. In the example depicted in FIG. 7, however, the LED chips $L_{11}$ to $L_{15}$ are controlled so that they do not emit light. A time that the LED chips $L_{11}$ to $L_{15}$ pass the light emission reference position 16 is such a very short period as that a human cannot perceive the light emitted by each of the LED chips, and a time which is, e.g., not more than 1/60 second is set. As a result, the illumination light becomes seemingly equivalent to the light obtained by mixing luminous colors of the LED chips $L_1$ to $L_{15}$ by the afterglow phenomenon of a human. In this example, the illumination light is perceived as light having a luminous color which aboundingly contains an orange color component and has a red color component mixed to some extent.

Figure 8:
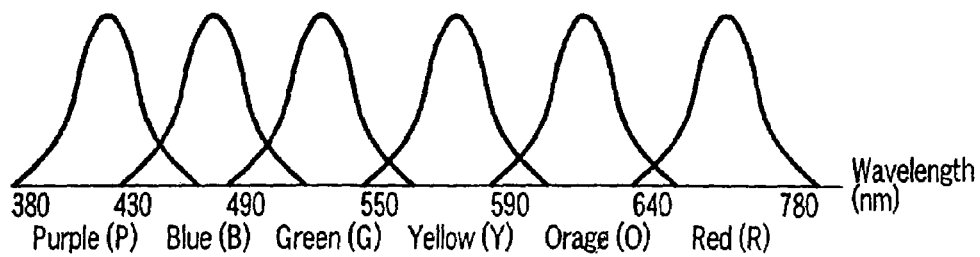
FIG. 8 is a view showing a spectral component of each color of visible light.

Various color components are generally roughly classified into a red color, an orange color, a yellow color, a green color, a blue color and a purple color as visible light, and they can be grasped as light having spectral components in a wavelength band shown in FIG. 8, for example. The LED chips which emit light of the red (R) color, the green (G) color and the blue (B) color are generally often utilized, but elements which emit the orange (O) color, the yellow color and the purple (P) have also been developed. Therefore, by suitably mixing and using these chips as described above, various tints can be flexibly created. Utilizing such an advantage readily enables toning so that colors of the illumination light which can make the green color noticeable can be obtained when performing illumination to excellently show, e.g., green leaves of a tree. Moreover, illumination light which approximates to the spectrum of the sun light can be realized.

Figure 9:
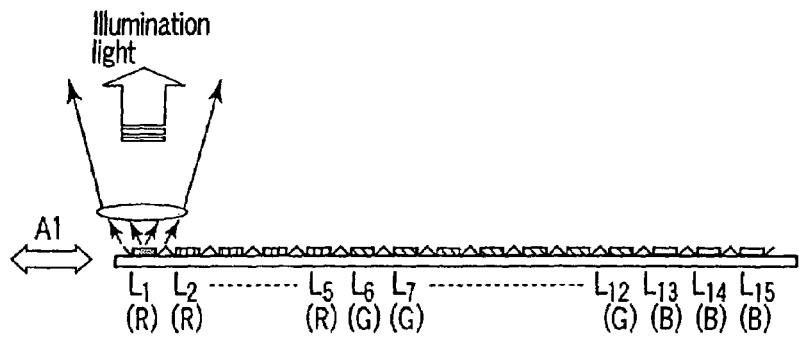
FIG. 9 is a view showing a structure of the light emission unit, illustrating that individual differences in light emission quantity between the arranged LED chips can be absorbed by using the illumination principle of the first embodiment when such individual differences exist.
Figure 10:
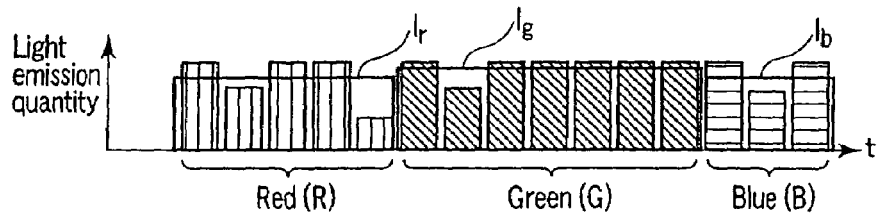
FIG. 10 is a view showing a state of light emission quantities of the respective LED chips in accordance with these chips in FIG. 9.

FIGS. 9 and 10 are views illustrating a state in which individual irregularities in light emission quantity of the arranged LED chips can be absorbed by using the illumination principle of this embodiment when such irregularities exist in the structure equal to that described in conjunction with FIGS. 6 and 7.

In the structure shown in FIG. 9, a difference from FIG. 9 lies in that LED chips $L_1$ to $L_5$ emitting light of the red (R) color, LED chips $L_6$ to $L_{12}$ emitting light of the green (G) color and LED chips $L_{13}$ to $L_{15}$ emitting light of the blue (B) color are arranged.

FIG. 10 shows a state of light emission quantities according to these chips. Even if light emission quantities obtained from the respective LED chips are not equal, for example, the red color is perceived as an average light emission quantity Ir obtained by subjecting the LED chips $L_1$ to $L_5$ to time average due to persistence of vision of a human. Likewise, the green color is perceived as an average light emission quantity Ig obtained by subjecting the LED chips $L_6$ to $L_{12}$ to time average, and the blue color is perceived as an average light emission quantity Ib obtained by subjecting the LED chips $L_{13}$ to $L_{15}$ to time average. This means that the averaged light emission quantity is perceived according to the illumination principle of this embodiment even if some irregularities are generated in the light emission quantities as well as waveform components of the LED chips in manufacture. Therefore, according to the illumination principle of this embodiment, there can be obtained an advantage that problems are small even if there are individual irregularities to some extent. The fact that the tolerance of individual irregularities is alleviated greatly affects a cost, and it is advantageous for productization. Incidentally, when all the LED chips $L_1$ to $L_{15}$ emit light, the emitted light is perceived as a color and a light emission quantity in which the average light emission quantities Ir, Ig and Ib are mixed.

This demonstrates an advantage that the illumination light which is close to substantially homogeneous illumination light can be obtained without perceiving small irregularities in light emission quantities of the LED chips by a human according to the illumination principle of this embodiment even if such irregularities are generated. In the average light emission quantity Ir, Ig or Ib, when a desired light emission quantity should be intentionally controlled, one method of controlling this quantity is previously measuring a statistic of a light emission quantity of the LED chip to be adopted and calculating and utilizing an average value based on its normal distribution. Another method is detecting an actual average light emission quantity Ir, Ig or Ib by using any light detecting means and controlling an application voltage and current to a corresponding LED chip to have a desired average light emission quantity value.

Second Embodiment

A second embodiment of an illumination apparatus using the illumination principle explained in conjunction with the first embodiment will now be described with reference to FIGS. 11 to 14.

Figure 11:
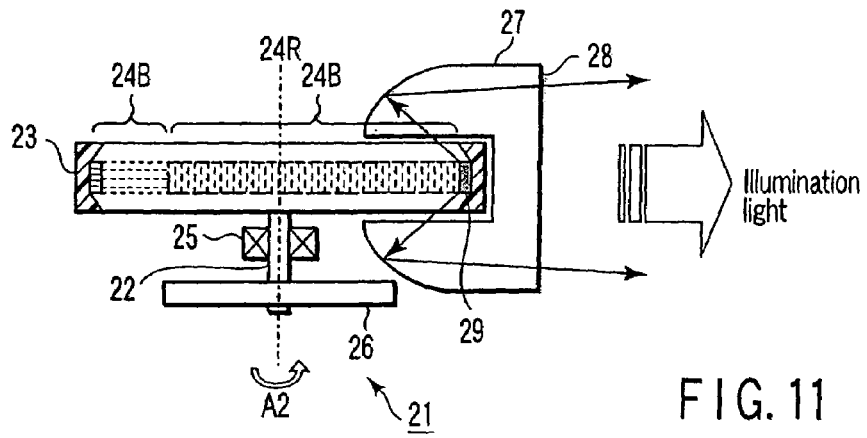
FIG. 11 is a view showing a structure of a flashlight as an illumination apparatus according to a second embodiment of the present invention in the form of a cross-sectional structure.

FIG. 11 is a view showing a structure of a flashlight 21 as the illumination apparatus according to the second embodiment of the present invention in the form of a cross-sectional structure.

In this embodiment, a drum support member 23 having a drum shape coupled with a rotating shaft 22 is used as a light control member in place of the linear support member 11 in FIG. 2. LED chips are closely arranged along an inner side surface of this drum support member 23 (in the drawing, these LED chips are illustrated as LED chip rows 24R and 24G and 24B which are continuously arranged in accordance with the same color and sectioned in accordance with each color (indicated by hatchings of different broken lines) set by a circumference in place of illustrating each of the LED chips for the sake of convenience). The rotating shaft 22 is supported by a rotating shaft bearing 25, and coupled with a drive motor 26 which is a movable portion as movable means. By adopting such a structure, the drum support member 23 can rotate at a high speed in a direction indicated by an arrow A2 by this drive motor 26.

Moreover, the drum support member 23 is partially inserted into a concave reflecting mirror 27 as an optical member in such a manner that the plurality of LED chips are positioned in the concave reflecting mirror 27. When the LED chips emit light in the concave reflecting mirror 27, the emitted light is reflected on the concave reflecting mirror 27 and projected from an opening 28 of the concave reflecting mirror 27. It is to be noted that a side of each LED chip has a reflection structure so that the light exiting from the side surface can be applied to the front side of the LED chip.

In such a structure, based on the illumination principle described in conjunction with the first embodiment, the LED chip emits light only when it reaches a predetermined position (light emission reference position 29) of the concave reflecting mirror 27 in cooperation with the rotating drum support member 23, and this operation is continuously performed with respect to the LED chips which continuously move, thereby obtaining the intensive illumination light. Additionally, the tints of the illumination light may be flexibly set based on luminous colors and the number of arrays of the LED chips as described with reference to FIGS. 6 and 7. Further, when the LED chips to be arranged is formed of a material which emits light having a near ultraviolet wavelength and a fluorescent substance which emits light in response to the near ultraviolet light is applied on the reflecting surface of the concave reflecting mirror 27, the same advantages can be obtained. In this case, tints of the illumination light can be set by appropriately mixing fluorescent substances which emit light having different colors.

Figure 12:
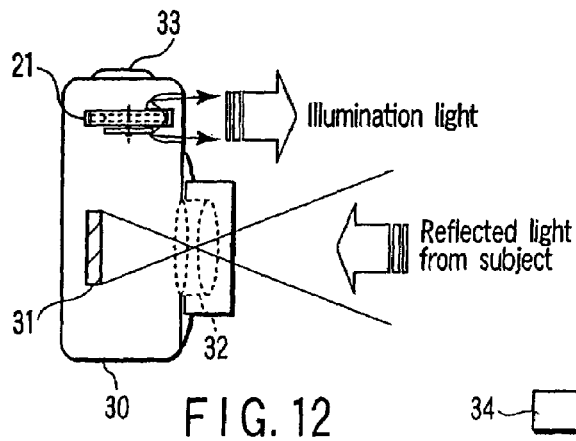
FIG. 12 is a view illustrating an arrangement of a flashlight in a camera (image capturing apparatus) in which the flashlight in FIG. 11 substitutes for a strobe.

FIG. 12 shows an example in which the flashlight 21 is incorporated and used in place of a strobe of a camera (image capturing apparatus). That is, the flashlight 21 having the above-described structure as a strobe, an image sensor 31 as imaging means, and an imaging optical system 32 as imaging optical means are arranged and constituted in a camera main body 30 as shown in the drawing. Furthermore, a shutter button 33 is arranged at an upper portion of the camera main body 30.

Figure 13:
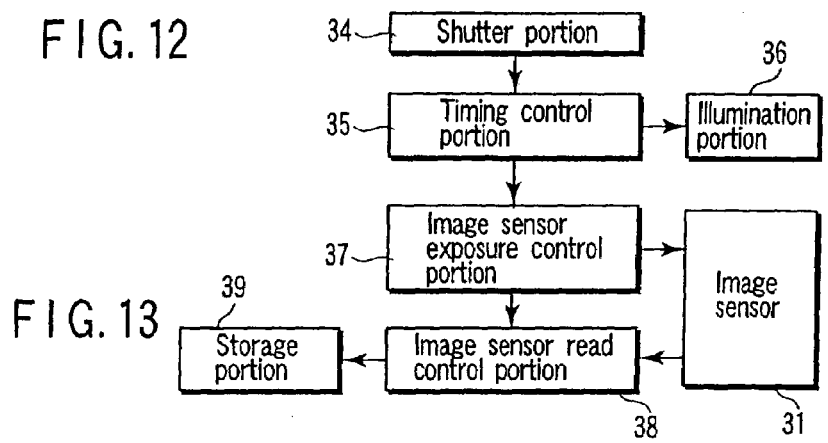
FIG. 13 is a function block diagram of this camera.

FIG. 13 is a function block diagram of such a camera. That is, a shutter portion 34 detects whether an operator has instructed an imaging operation based on whether the shutter button 33 is turned on, and inputs its detection signal to a timing control portion 35. This timing control portion 35 gives a command which executes preliminary illumination to an illumination portion 36 corresponding to the flashlight 21. Referring to a correspondence relationship in the basic block diagram in FIG. 1, the detection signal is input to the operation start command portion 1.

Moreover, the timing control portion 35 supplies a timing signal indicative of end of a predetermined preliminary illumination period to an image sensor exposure control portion 37, and instructs an exposure operation to the image sensor 31 from the image sensor exposure control portion 37, thereby executing the exposure. The illumination portion 36 continuously executes imaging illumination in a predetermined period. Then, when the exposure operation is terminated, the image sensor exposure control portion 37 supplies an exposure operation end instruction to an image sensor read control portion 38. In response to this, the image sensor read control portion 38 reads imaging information accumulated in the image sensor 31, converts this information into data, and temporarily accumulates this data in a storage portion 39. With end of this accumulation operation, a series of the imaging operation is terminated.

Figure 14:
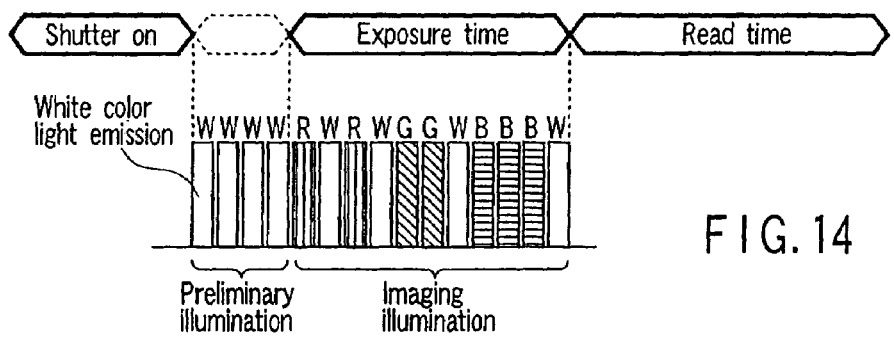
FIG. 14 is a view illustrating a time-series operation when performing imaging by using this camera.

FIG. 14 shows an example in which a white color LED is added as a luminous color, and illustrates a time-series operation when performing imaging by using a camera configured as shown in FIG. 12.

That is, immediately after imaging is set to on by the shutter button 33 and the imaging operation is started, the flashlight 21 starts a light emission operation. After a predetermined time elapses, the exposure of the image sensor 31 is effected. After an exposure time elapses, a signal is read from the image sensor 31. As a result, a series of the imaging operation is terminated. In this embodiment, in the period from changing the shutter button 33 to ON to start of the exposure of the image sensor 31, the illumination light of the white color is emitted from the flashlight 21, and a kind of a red-eye preventing effect is carried out. In the exposure period of the image sensor 31, the illumination light having tints required for imaging conditions is toned and emitted while exploiting features of this illumination principle. When using this light as imaging illumination light, color information of a subject cannot be faithfully obtained as reflected light components by the illumination using only specific colors in some cases. Therefore, as shown in the drawing, it is also necessary to appropriately add the LED chip which emits light of the white color to the LED chips of other colors and arranging this LED chip.

It is to be noted that a digital camera using the image sensor 31 is taken as an example as the camera in the above description, but it is needless to say that the flashlight 21 can be likewise applied to a film camera using a photographic film.

Third Embodiment

A description will now be given as to a third embodiment of an illumination apparatus using the illumination principle explained in conjunction with the first embodiment. The illumination apparatus according to this embodiment is an example applied to an illumination unit of an image projection display apparatus (which will be referred to as a projector apparatus hereinafter).

Figure 15:
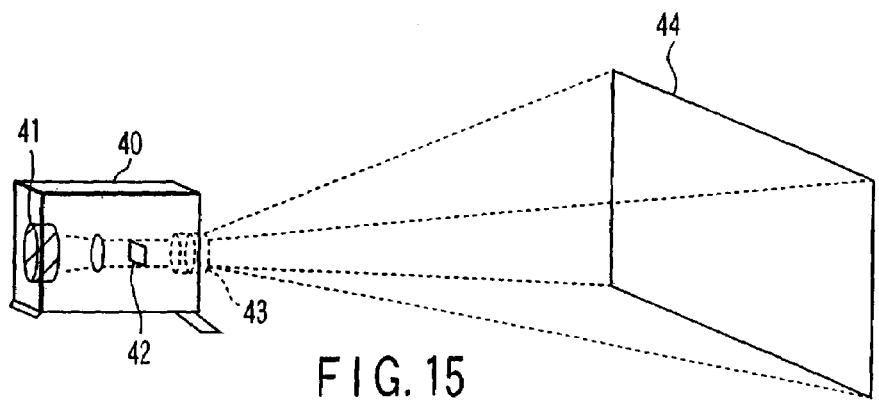
FIG. 15 is a view showing an overview and a basic structure of an image projection display apparatus (projector apparatus) using an illumination unit as an illumination apparatus according to a third embodiment of the present invention.

FIG. 15 is a view showing a general view and basic structure of the projector apparatus. That is, a projector main body 40 comprises an illumination unit 41, a spatial light modulation element 42 as an illumination target area, and a projection optical system 43 based on a predetermined arrangement relationship. Here, the illumination unit 41 is an illumination apparatus according to this embodiment having a light source and an illumination optical system as a basic structure. The spatial light modulation element 42 is light modulating means which receives light emitted from the illumination unit 41 and individually modulates the brightness in accordance with each pixel constituting an image. The projection optical system 43 is projection optical means for projecting light which has passed through the spatial light modulation element 42. The light emitted from the projection optical system 43 is projected on a screen 42, and an image is displayed. As the spatial light modulation element 42, it is possible to utilize one using a transmission type liquid crystal, one using a reflection type liquid crystal, one using a fine mirror array which can perform a reflection angle control and others. In the present invention, any of these elements can be used. However, when the reflection type element is used, a structure of the optical system different from that depicted in FIG. 15 is required, but it is general, thereby eliminating the explanation.

Figures 16A, 16B:
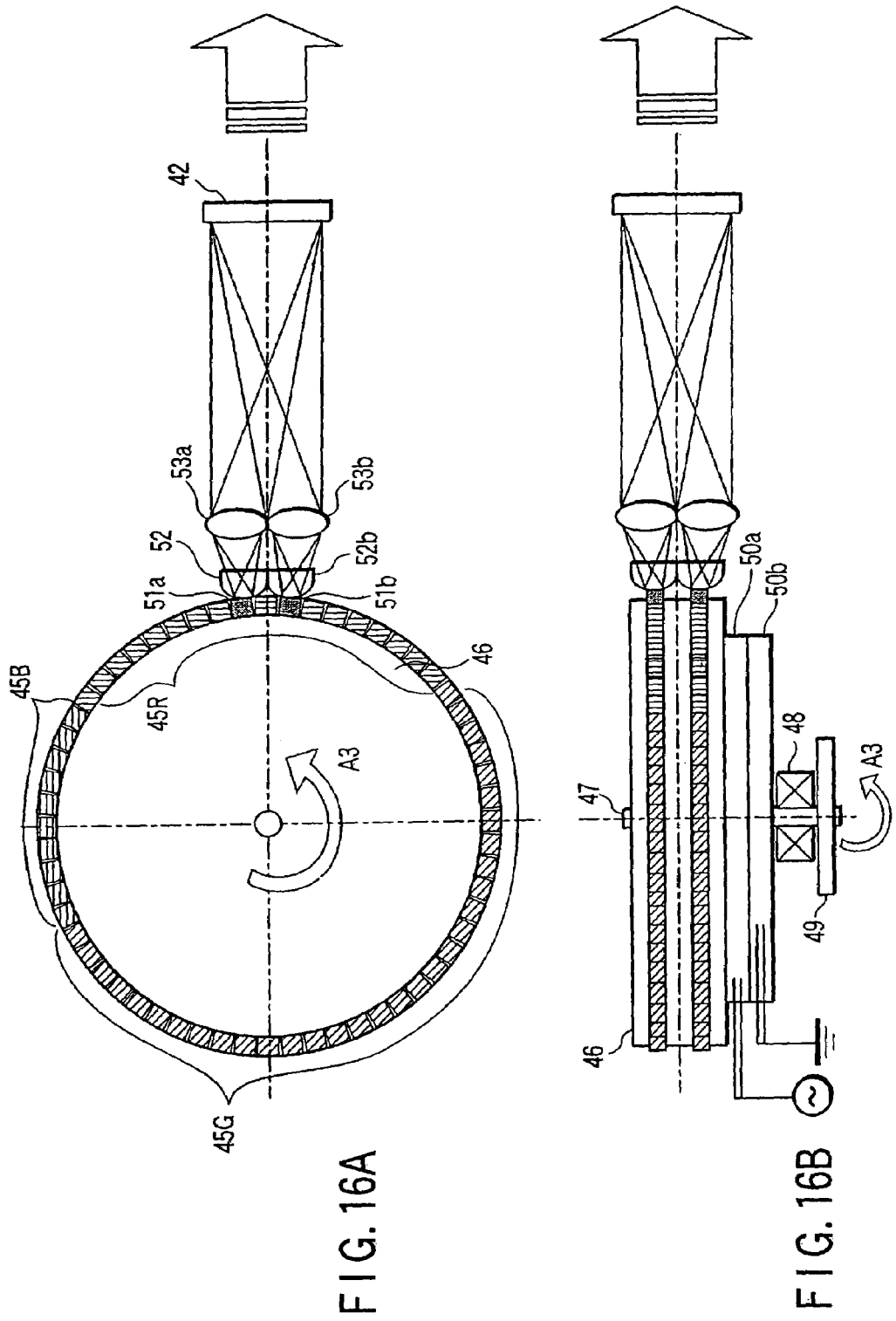
FIG. 16A is a view showing an illumination unit as the illumination apparatus according to the third embodiment from above.
FIG. 16B is a view showing the illumination unit depicted in FIG. 16A from a side surface.

FIGS. 16A and 16B are views showing a detail of the illumination unit 41 as the illumination apparatus according to this embodiment. It is to be noted that FIG. 16A is a view showing the illumination unit 41 from above, and FIG. 16B is a view showing the same illumination unit 41 from a side surface.

That is, in this illumination unit 41, an LED chip row 45R whose luminous color is the red (R) color, an LED chip row 45G whose luminous color is the green (G) color and an LED chip row 45B whose luminous color is the blue (B) color are mounted and arranged in two stages on an outer peripheral side surface of a drum support member 46 as a light control member as shown in the drawing. This drums support member 46 is coupled with a rotating shaft 47. The rotating shaft 47 is held by a rotating shaft bearing 48, and can be rotated and driven in a direction indicated by an arrow A3 in the drawing by a drive motor 49 which is a movable portion as movable means. Ring-shaped power supply contact points 50a and 50b are also coupled with the rotating shaft 47. These power supply contact points 50a and 50b can be also rotated together with the drum support member 46.

Such a structure has a secondary effect that heat radiation of the luminous bodies can be effectively performed since the luminous bodies themselves rotate. Of course, a forcible air-cooled mechanism can be readily constituted by utilizing the rotating drive force.

Moreover, in this embodiment, two light emission reference positions 51a and 51b for the LED chips are set. Concave reflecting mirrors 52a and 52b are constituted at these light emission reference positions 51a and 51b. Thus, the light emitted from the LED chip, which has reached the light emission reference positions 51a and 51b, is directly taken in by corresponding condenser lenses 53a and 53b or indirectly taken in by these lenses after reflected on the concave reflecting mirrors 52a and 52b. Then, after subjected to a light path control by these condenser lenses 53a and 53b, the light is applied to the same spatial light modulation element 42 in an overlapping manner.

When the drum support member 46 is rotated by the drive motor 49, the arranged LED chips rows 45R, 45G and 45B also rotate in cooperation with the drum support member 46, and the LED chips placed at the light emission reference positions 51a and 51b instantaneously emit light. Power required for this light emission is supplied from the power supply contact points 50a and 50b, and used as a power which allows light emission of the LED chips which must emit light. As to a method of performing the light emission control, a detailed embodiment is not presented, but one method is using the technique described in the first embodiment with reference to FIGS. 1 and 2.

It is needless to say that the high-luminance light emission with the enhanced heat radiation properties of the LED chips can be realized by configuring the illumination unit 41 for the projector apparatus with such a structure like the foregoing embodiments. Additionally, when the single spatial light modulation element 42 is used and a color image is to be projected, a color surface sequential illumination mode which sequentially applies primary color illumination light of red, green and blue is required. In this case, according to the present embodiment, since illumination of necessary colors can be performed wastelessly by utilizing characteristics of the LED chips which can emit light having primary colors, the electric energy can be efficiently utilized. When a conventional white lamp is used as a light source, since one color alone is used at the same time among primary colors which are constantly emitted in the color surface sequential illumination mode, any other colors are not utilized, and the energy must be lost.

FIGS. 17 and 18 illustrate a structure from the light emission reference positions 51a and 51b for the LED chips to the spatial light modulation element 42 in FIGS. 16A and 16B and its illumination method by presenting a further detailed embodiment.

FIG. 17 is a view schematically showing an illumination method which forms an image of an LED chip 54 on the spatial light modulation element 42 as an illumination target. In this embodiment, a first irradiation area 55 and a second irradiation area 56 which have a conjugate relationship are defined. Additionally, the optical system has such a structure as that the first irradiation area 55 is positioned in the vicinity of the LED chip 54 and the second irradiation area 56 is positioned in the vicinity of a position at which the spatial light modulation element 42 is arranged.

That is, the output light from the LED chip 54 is condensed by using a condenser microlens 57 (corresponding to the condenser lenses 53a and 53b). Further, the light from the plurality of LED chips 54 condensed by the condenser microlens 57 is caused to overlap on the spatial light modulation element 42 by an overlapping lens 58. By doing so, individual differences in brightness between the LED chips 54 can be averaged, thereby realizing homogenous illumination. The plurality of LED chips 54 may be used, and one LED chip 54 may be used if the brightness is sufficient. Here, a substantially conjugate relationship is provided to the LED chips 54 and the spatial light modulation element 42 as an illumination target. By doing so, all of the light ideally taken in by the condenser microlens 57 can be led to the spatial light modulation element 42, the illumination area is not wasted at all, and the light efficiency can be improved. For example, in cases where both the LED chip 54 and the spatial light modulation element 42 have a rectangular shape, if the spatial light modulation element 42 has a rectangular shape with an aspect of 4:3 and the LED chip 54 also has a rectangular shape with an aspect of 4:3, the illumination optical system can have an isotropic lens structure which just provides magnifications. Furthermore, since the illumination light is not supplied to any area other than the display area of the spatial light modulation element 42, the illumination efficiency is improved. Of course, if the spatial light modulation element 42 is a wide screen whose aspect ratio is 16:9, the LED chip 54 which has an aspect ratio of 16:9 according to this element is preferable.

Alternatively, if the LED chip 54 has a square shape, the illumination efficiency can be improved by adopting an anamorphic optical system having a vertical power larger than a horizontal power as the condenser microlens 57 or the overlapping lens 58.

Another advantage of providing the conjugate relationship to the LED chip 54 and the spatial light modulation element 42 is that illumination irregularities are hard to be generated even if light distribution characteristics of the LED chip 54 have an angular dependence.

Further, there is the following advantage. If there is a brightness distribution in an LED chip surface, illumination irregularities are generated. The LED chip 54 actually has an electrode structure for electrical conduction, and existence of a bonding wire in the chip may generate the brightness distribution in the chip surface in some cases. In such a case, a shadow of the bonding can prevent the illumination irregularities from being generated by appropriately defocusing a position of the spatial light modulation element 42 from a position of an LED chip image. That is, in the LED chip 54 and the spatial light modulation element 42 arranged in the first irradiation area 55 and the second irradiation area 56 having the conjugate relationship, the LED chip 54 is arranged at a position deviating from the first irradiation area 55. By so doing, a blurry image of the LED chip 54 is projected on the spatial light modulation element 42 arranged in the second irradiation area 56, thereby averaging the brightness distribution in the surface.

FIG. 18 shows an example of another illumination method in which the plurality of LED chips 54 are used as light sources. As optical members which condense light projected from the LED chips 54, there is adopted a two-stage structure comprising condenser microlenses 57 as condensing optical elements and deflecting microlenses 59 as deflecting optical elements in accordance with the respective LED chips 54. The conjugate relationship is not provided to the LED chips 54 and the spatial light modulation element 42 as an illumination target, but the condenser microlenses 57 on the front stage of the optical members having the two-stage structure and the spatial light modulation element 42 have a conjugate positional relationship. That is, in a positional relationship between the first irradiation area 55 and the second irradiation area 56 having the conjugate relationship, there is adopted a structure of the optical system that the first irradiation area 55 is positioned in the vicinity of the condenser microlenses 57 and the second irradiation area 56 is positioned to the spatial light modulation element 42 as an illumination target. Furthermore, the condenser microlenses 57 are arranged to be positioned in the vicinity of front focal positions of the deflecting microlenses 59 so that images of the LED chips 54 obtained by the condenser microlenses 57 are positioned in the vicinity of the deflecting microlenses 59. With such a structure, incident pupils formed on the condenser microlenses 57 can be relayed by the deflecting microlenses 59 and an overlapping lens 58 which is an overlapping optical element as overlapping means on the rear stage, thereby forming pupils at a position where the spatial light modulation element is arranged.

An advantage of such an illumination method and structure is that individual differences in the brightness of the LED chips 54 can be averaged to obtain homogenous illumination since output light from the plurality of LEDs is superimposed. Moreover, there is another advantage that existence of the illumination target on the pupil surface can suppress illumination irregularities even if there is a brightness distribution in the surface of each LED chip.

Figure 19B:
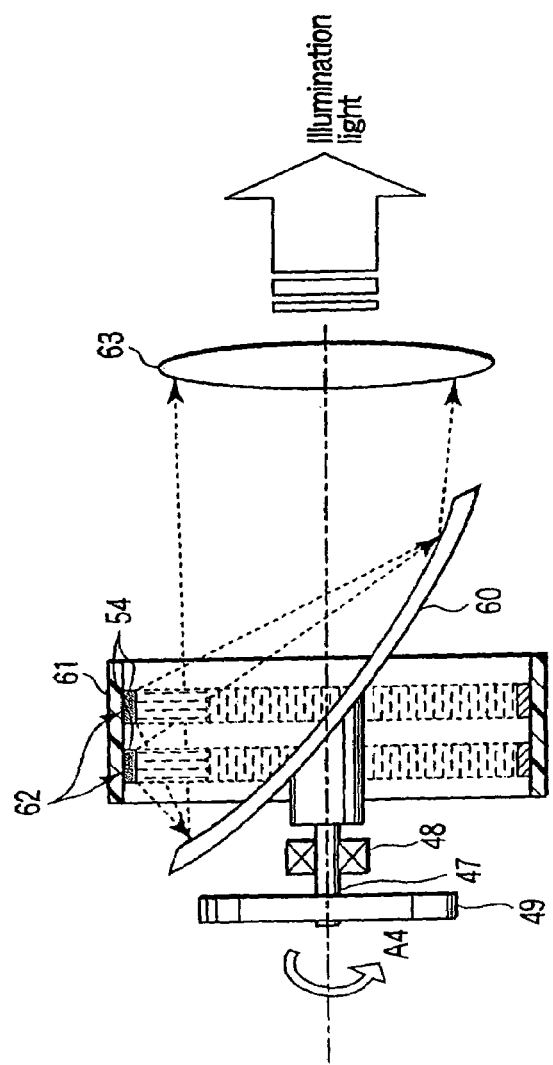
FIG. 19B is a cross-sectional view taken along the line aa' in FIG. 19A.
Figure 19A:
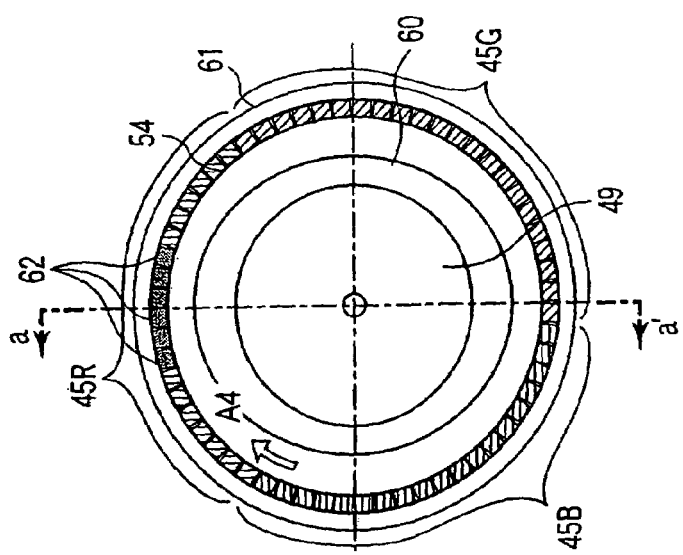
FIG. 19A is a view showing a modification of an illumination unit as the illumination apparatus according to the third embodiment from behind.

FIGS. 19A and 19B are views showing a modification of the illumination unit 41 as the illumination apparatus according to the third embodiment. FIG. 19A is a view showing the illumination unit 41 from a rear surface, and FIG. 19B is a cross-sectional view taken along the line aa' in FIG. 19A.

In this modification, a concave reflecting mirror 60 which is a mirror member as a light control member is coupled with a rotating shaft 47. The rotating shaft 47 is supported by a rotating shaft bearing 48, and coupled with a drive motor 49. This drive motor 49 enables the concave reflecting mirror 60 to rotate in a direction indicated by an arrow A4 in the drawing at a high speed.

In contrast, a drum support member 61 with a drum shape is fixed and formed the rotating shaft 47 being used as a common central axis as shown in the drawing. Additionally, LED chips 54 are closely arranged on two stages along an inner side surface of the drum support member 61. It is to be noted that the number of stages on which the LED chips 54 are arranged is not restricted to two, and the appropriate number of stages is set according to needs. In FIG. 19B, in place of illustrating each LED chip, LED chips are drawn as LED chip rows 45R, 45G and 45B in such a manner that the chips having the same color are continuously arranged, they are sectioned in accordance with each color set by the circumference (indicated by hatchings of different broken lines), and the colors of emitted light are switched in the order of the red (R) color, the green (G) color and the blue (B) color in a process of one revolution. That is, illumination light capable of generating a field image with three primary colors required for a color image of one frame can be obtained with respect to one revolution of the concave reflecting mirror 60. That is, the LED chips 54 arranged on the drum support member 61 repeat sequential light emission in the time-sharing manner, and performs chain light emission to go around on the inner side surface (light emission points 62 go around). In this case, when the concave reflecting mirror 60 performs a rotating operation, the light emission control is performed in such a manner that the LED chips 54 having a correspondence relationship emit light in synchronization with this rotating operation. That is, there is achieved a structural relationship that the light emitted from the LED chips 54 is reflected and condensed by the concave reflecting mirror 60 and projected to the irradiation area through the optical lens 63 as an optical member.

According to this structure, the LED chips themselves do not have to be rotated and moved as described in conjunction with the first and second embodiments. Therefore, transmission of an electrical control signal or supply of a power to the LED chips can be fixed and carried out, thereby greatly facilitating the design.

Further, configuring a forcible air-cooled mechanism which shares the rotating drive force of the drive motor 49 and urges heat radiation of the LED chips can be facilitated. Furthermore, heat is dispersed by movement of heat sources rather than intensive heat generation at the same position of the drum support member, and hence it can be said that this structure is convenient for heat radiation.

FIGS. 20A and 20B are views showing another modification of the illumination unit 41 as the illumination apparatus according to the third embodiment. It is to be noted that FIG. 20A is a view showing the illumination unit 41 from a rear surface, and FIG. 20B is a cross-sectional view taken along the line bb' in FIG. 20B.

In this modification, a planar reflecting mirror 64 which is a mirror member as a light control member is coupled with a rotating shaft 47. The rotating shaft 47 is supported by a rotating shaft bearing 48, and coupled with a drive motor 49. This drive motor 49 forms a mechanism that the planar reflecting mirror 64 can rotate in a direction indicated by an arrow A5 in the drawing at a high speed.

In contrast, a drum support member 61 with a drum shape is fixed and formed with the rotating shaft 47 being used as a common central axis, and LED chips 54 are closely arranged on two stages along an inner side surface of the drum support member 61.

Moreover, two sets of condenser lenses 53 are supported by a rotating support member 65 integrated with the rotating shaft 47 in such a manner that these lenses can be rotated and moved in cooperation with the planar reflecting mirror 64. Incidentally, it is basic that the number of stages on which the LED chips 54 are arranged is equal to the number of sets of condenser lenses 53. However, these numbers are not restricted thereto, and setting appropriate numbers according to needs can suffice. Additionally, how to arrange of the LED chips 54 and how to emit light are the same as those in the modification shown in FIGS. 19A and 19B. However, although the light emission control is effected in such a manner that the LED chips 54 having a correspondence relationship emit light in synchronization with a rotating operation of the planar reflecting mirror 64 when the planar reflecting mirror 64 performs this operation, the condenser lenses 53 are provided in an arrangement relationship with which the light emitted from the LED chips 54 can be excellently taken in. That is, there is formed a structural relationship that the light from the activated LED chips 54 is once condensed by the condenser lenses 53, reflected by the planar reflecting mirror 64 so that its light path is bent, and projected to the irradiation target area through the optical lens 63.

Figure 21B:
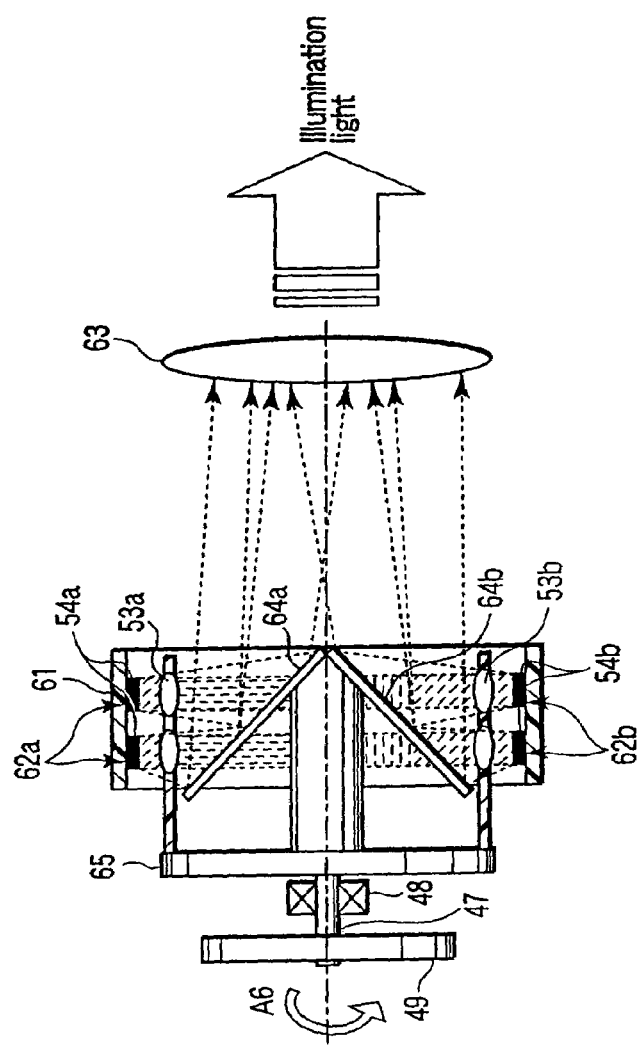
FIG. 21B is a cross-sectional view taken along the line cc' in FIG. 20A.
Figure 21A:
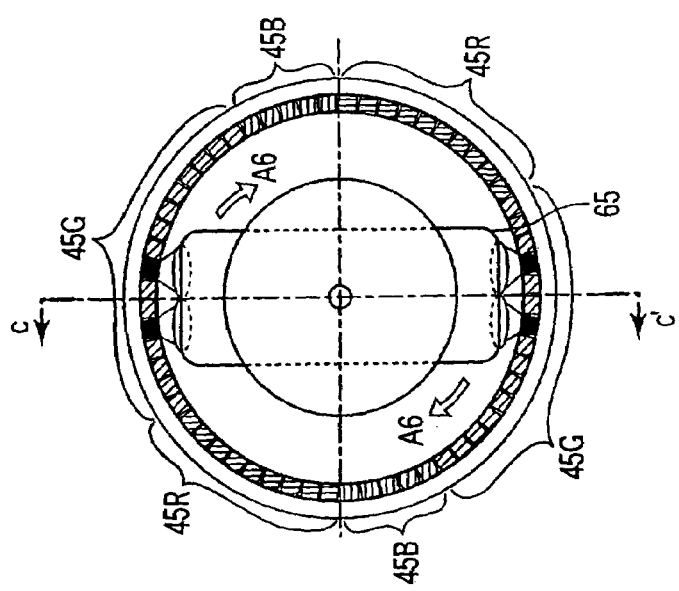
FIG. 21A is a view showing an example obtained by further modifying the modification depicted in FIGS. 20A and 20B from behind.

FIGS. 21A and 21B show an example obtained by further modifying the modification depicted in FIGS. 20A and 20B. Like FIGS. 20A and 20B, FIG. 21A is a view showing the illumination unit 41 from a rear surface, and FIG. 21B is a cross-sectional view taken along the line cc'. Moreover, like reference numerals denote elements which have the same functions as those in FIGS. 20A and 20B, thereby eliminating their explanation.

That is, in FIGS. 21A and 21B, two planar reflecting mirrors 64a and 64b and two condenser lenses 53a and 53b are configured as pairs with respect to a rotating shaft 47. The respective members are set so that they have a symmetrical positional relationship with respect to the rotating shaft 47. In regard to the light emitted from LED chips 54a and 54b which have reached light emission points 62a and 62b provided at symmetrical positions, the light condensed by the condenser lens 53a is reflected by the planar reflecting mirror 64a, and the light condensed by the condenser lens 53b is reflected by the planar reflecting mirror 64b so that the light is applied to the irradiation target area through an optical lens 63. A structure that the LED chips 54a (54b) are closely arranged on two stages along an inner side surface of a drum support member 61 is the same as that depicted in FIGS. 19A and 19B and that illustrated in FIGS. 20A and 20B. In this modification, however, two cycles of switching of colors of the light emitted in the order of the red (R) color, the green (G) color and the blue (B) color are prepared in a process of one revolution of the rotating support member 65 in a direction indicated by an arrow A6 in the drawing. That is, it is possible to obtain illumination light which can generate a field image of three primary colors required for color images of two frames with respect to one revolution of the drum support member 61. The two frames correspond to arrangement ranges of the LED chips described as an even-numbered frame and an odd-numbered frame in FIG. 21A.

When such an arrangement state of the LED chips is maintained, the number of revolutions of the drive motor 49 can be reduced to ½ of that in the example shown in FIGS. 19A and 19B or the example depicted in FIGS. 20A and 20B. Therefore, loads on the drive motor 49 can be reduced. Additionally, the number of LED chips which can emit light at the same time can be increased, thereby increasing a light quantity of the illumination light. However, each light emission time is increased as compared with the example shown in FIGS. 19A and 19B or FIGS. 20A and 20B. In a tolerance of the heat radiation performance or characteristics of the LED chips, the above-described effects can be realized without reducing the light emission quantity.

It is to be noted that, in the examples shown in FIGS. 16A and 16B, FIGS. 19A and 19B, FIGS. 20A and 20B and FIGS. 21A and 21B, a period in which any two colors are simultaneously emitted with a color switching timing exists in a process of sequentially switching colors of the emitted light in the order of the red color, the green color and the blue color. It is basically impossible to simultaneously perform the modulation control over images having components obtained by mixing two colors by one spatial light modulation element 42 to be illuminated. Therefore, it is good enough to effect the control which prevents corresponding LED chips from emitting light in the two-color mixing period in such a manner that such a period does not exist. Alternatively, allowing the two-color mixing period and causing the spatial light modulation element 42 to perform in this period the modulation control in accordance with an image representing a monochromatic luminance component which is common to two colors as targets can be considered as one technique.

A description will now be given as to a modification using a prism which is a refraction member as a light control member with reference to FIGS. 22A and 22B in place of the structure using the reflecting mirror explained in conjunction with FIGS. 19A and 19B, FIGS. 20A and 20B and FIGS. 21A and 21B. Here, FIG. 22A is a view showing the illumination unit 41 from a rear surface, and FIG. 22B is a cross-sectional view taken along the line dd' in FIG. 22A. It is to be noted that FIG. 22A shows LED chips rows by solid lines for clarifying the drawing, LED chips rows of which should be indicated by broken line because they cannot be seen from the rear surface.

In this modification, a prism 67 as a refraction is member is integrated with a cylindrical rotating support member 66 coupled with a rotating shaft 47. The rotating shaft 47 is supported by a rotating shaft bearing 48, and coupled with a drive motor 49. This drive motor 49 forms a mechanism that the prism 67 can rotate in a direction indicated by an arrow A7 in the drawing at a high speed.

In contrast, a conical support member 68 with a conical shape is fixed and formed as shown in the drawing with the rotating shaft 47 being used as a common central axis. Further, LED chips 54 are closely arranged on two stages along an inner side surface of this conical support member 68. Here, a left stage in FIG. 22B is referred to as a stage a, and a right stage in the same is referred to as a stage b. Of course, the number of stages on which the LED chips 54 are arranged is not restricted to two, and the appropriate number of rows can be set according to needs. Furthermore, in place of illustrating each LED chip, these chips are illustrated as LED chip rows 45R, 45G and 45B in such a manner that the chips of the same color are continuously arranged, the LED chips are sectioned in accordance with each set color (indicated by hatchings of different broken lines) and colors of emitted light are switched in the order of the red (R) color, the green (G) color and the blue (B) color in a process of one revolution. That is, it is possible to obtain the illumination light which can generate a field image of three primary colors required for a color image of one frame with respect to one revolution of the conical support member 68.

Condenser lenses 53 are configured to be equal to the modification shown in FIGS. 20A and 20B. That is, the light emitted from the LED chips 54 which have reached light emission points 62 is condensed by the condenser lenses 53, and caused to enter an incident surface 69 of the prism 67. The light exiting from an outgoing radiation surface 70 of this prism 67 is applied to the irradiation target area through an optical lens 63.

The LED chips 54 arranged on the conical support member 68 repeat sequential light emission in the time-sharing manner, and perform chain light emission to go around the inner side surface (light emission points 62 go around). In this example, however, it is determined that the LED chip on one stage alone emits the light, namely, the LED chip 54 on the stage b does not emit the light when that on the stage a emits the light, and the LED chip 54 on the stage a does not emit the light when that on the stage b emits the light, as shown in FIG. 23. By so doing, assuming that all the chips on the stage b form the green (G) color and the stage a is formed while separating an area of the red (R) color and an area of the blue (B) color from each other as shown in FIG. 22A, the following operation can be repeated as one cycle. That is, with the revolution of the conical support member 68, the LED chip 54 in the chip row 45R corresponding to the red (R) color on the stage a first emits the light for a predetermined period; this LED chip is switched to the LED chip 54 in the chip row 45G corresponding to the green (G) color on the stage b simultaneously with end of this light emission period of the red color, and the switched LED chip emits the light for a predetermined period; this LED chip is likewise switched to the LED chip 54 in the chip row 45B corresponding to the blue (B) color on the stage a simultaneously with end of the light emission period of the green color, and the switched LED chip emits the light for a predetermined period; and, at last, this LED chip is again switched to the LED chip 54 in the chip row 45G corresponding to the green (G) color on the stage b simultaneously with end of the light emission period of the green color, and the switched LED chip emits the light for a predetermined period. In this manner, it is possible to form a sequence which can instantaneously switch colors of the light emitted in the order of red, green, blue and green in one cycle.

With such a structure and light emission control, different luminous colors can be prevented from being mixed at a luminous color switching point, thereby instantaneously effecting switching of the luminous colors. In the examples shown in FIGS. 19A and 19B, FIGS. 20A and 20B and FIGS. 21A and 21B, providing a non-light emission range between the adjacent LED chips having different luminous colors can avoid mixing of different colors in a switching state of the luminous colors. However, a light utilization efficiency in a period of providing such a range is reduced. In contrast, when the luminous colors can be instantaneously switched like the example shown in FIGS. 22A and 22B, image switching of the spatial light modulation element 42 of the projector apparatus can be also instantaneously performed, and a wasteful time, i.e., a non-light emission period can be eliminated, thereby improving the illumination efficiency.

Fourth Embodiment

A description will now be given as to a fourth embodiment of an illumination apparatus using the illumination principle described in conjunction with the first embodiment. The illumination apparatus according to this embodiment is an example applied to an illumination unit of the projector apparatus, and has both a projector function and a general illumination function.

Figure 24:
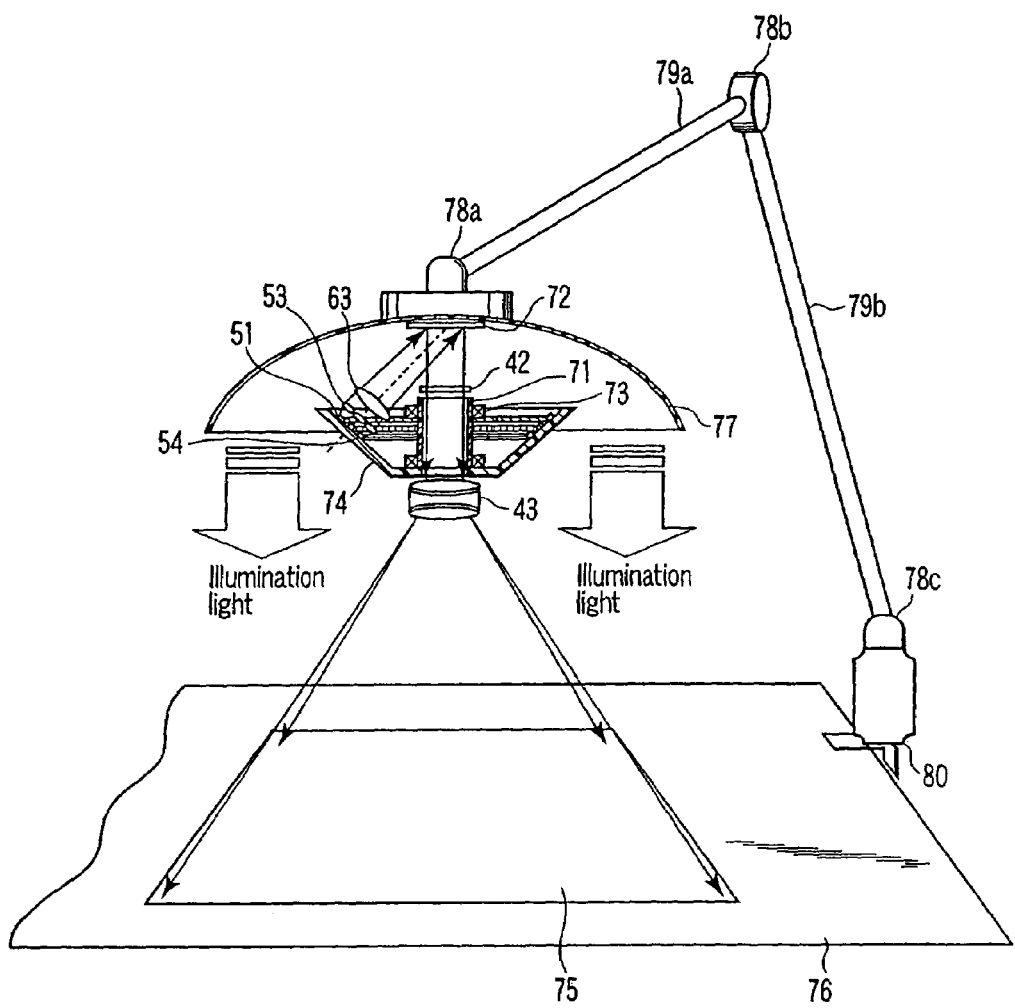
FIG. 24 is a view showing a structure of a projector apparatus to which an illumination unit as an illumination apparatus according to a fourth embodiment of the present invention is applied.

FIG. 24 is a view showing a structure of a projector apparatus to which an illumination unit as the illumination apparatus according to this embodiment is applied. This drawing shows a part corresponding to a projector function and a part corresponding to an illumination reflecting umbrella in the form of a cross-sectional view, and shows any other apparatus part in the form of a perspective view.

As shown in the drawing, a cylindrical rotating shaft 71 is provided, and a fixed planar mirror 72 is set on an extended line of a central axis of the rotating shaft 71. The rotating shaft 71 is supported by a rotating shaft bearing 73, and can be rotated and driven by a non-illustrated drive motor.

Further, a rotating conical support member 74 with a conical shape is integrated with the rotating shaft 71 as shown in the drawing with the rotating shaft 71 being used as a common central axis. Furthermore, LED chips 54 are closely arranged on three stages along an inner side surface of this rotating conical support member 74. Of course, the number of stages on which the LED chips 54 are arranged is not restricted to three, and the appropriate number of stages can be set according to needs. In this drawing, in place of illustrating each of the LED chips, these chips are illustrated as LED chip rows that the chips of the same color are continuously arranged, the LED chips are sectioned in accordance with each color set by the circumference (indicated by hatchings of different broken lines) and colors of light emitted in the order of the red (R) color, the green (G) color and the blue (B) color are switched in a process of one revolution. That is, it is possible to obtain the illumination light which can generate a field image of three primary colors required for a color image of one frame with respect to one revolution of the rotating conical support member 74.

The light emitted from the LED chip 54 which has reached a light emission reference position 51 is taken in by each corresponding condenser lens 53, optically controlled into a state close to parallel light by an optical lens 63, then reflected by the fixed planar mirror 72 and applied to a spatial light modulation element 42 in an overlapping state. In this embodiment, a single-plate transmission type liquid crystal is used as the spatial light modulation element 42. The light modulated in accordance with an image by this spatial light modulation element 42 is projected on a projection surface 75 by a projection optical system 43, resulting in a formed image. As this projection surface 75, a part of a table surface 76 on which this projector apparatus is set is utilized.

The condenser lens 53, the optical lens 63, the fixed planar mirror 72, the spatial light modulation element 42 and the projection optical system 43 are all configured to be fixed to the projector apparatus so that they all have a predetermined positional relationship, and they do not rotate. The LED chips 54 arranged to the rotating conical support member 74 repeat sequential light emission in the time-sharing manner and perform chain light emission with their rotation and movement based on the illumination principle described in conjunction with the first embodiment.

In contrast, when this projector apparatus is utilized as a general illumination apparatus, rotation of the rotating conical support member 74 is caused to stand still, and all or a part of the LED chips 54 arranged to the rotating conical support member 74 are caused to emit light at the same time. The simultaneously emitted light is reflected by the umbrella reflecting member 77 as reflecting means, and applied to the table surface 76, and the table surface 76 is illuminated like a regular lighting equipment. These drive controlling means and switching means of the projector function and the general illumination function are not illustrated in detail, but they are additionally provided in this apparatus.

The reflecting member 77 is supported by a flexibly movable support member comprising joints 78a, 78b and 78c and arms 79a and 79b and a base 80. Further, the base 80 is fixed to the edge of the table surface 76.

It is to be noted that the LED chips 54 arranged to the rotating conical support member 74 are not restricted to the primary luminous colors, and appropriately arranging LED chips which emit white light leads to the excellent color balance of illumination light when utilizing these chips as a regular illumination function, which is convenient. Furthermore, when utilizing the LED chips as the projector function, their white light does not have to be used. In any case, it is good enough to adjust the tints of the illumination light in accordance with preferences or applications of a user as described in conjunction with the first embodiment.

As described above, according to the present invention, it is possible to realize the projector apparatus which has both the projector function which can effectively utilize the LEDs which are expected as light sources for coming generation and include various advantages and the general illumination function. In further acceleration of digitization and processing of image information, an environment in which quite readily digitized image information is viewed is given by provision of the apparatus having the image display function as a part of the illumination equipment rather than viewing the image information in an additionally provided display. Moreover, when the displaying means is the projector, uses with the intimacy are enabled in daily life. For example, a display screen size can be flexibly selected, or the display portion can be set on a table or a desk and does not require a dedicated space. Additionally, despite of the fact that display in a relatively large screen is possible, the projector apparatus can be incorporated in a general illumination equipment because the illumination unit itself can be reduced in size.

Although the present invention has been described based on the foregoing embodiments, the present invention is not restricted to the above embodiments, and various modifications or applications can be of course carried out within the scope of the present invention.

For example, in order to realize the above-described illumination principle, it is a matter of course that various know techniques other those that described in the foregoing embodiments can be applied to the individual luminous bodies, the mechanism which causes the luminous bodies to emit light, how to arrange the luminous bodies, the mechanism which can move the luminous bodies, and the optical system required to obtain condensed light or illumination light.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An illumination apparatus which illuminates an illumination target area observed by an operator of the apparatus with light, comprising:
    an illumination color setting portion configured to set a color of illumination light illuminating the target area;
    a plurality of luminous bodies configured to emit light having spectral components of different wavelength bands, respectively;
    a luminous body selection portion configured to select luminous bodies emitting the light, of the plurality of luminous bodies, in accordance with the color of the illumination light set by the illumination color setting portion; and
    a luminous body drive portion configured to allow each of the luminous bodies selected by the luminous body selection portion to conduct pulse light emission,
    wherein the plurality of luminous bodies are comprised of a plurality of luminous bodies emitting light which has the same spectral components; and
    the luminous body drive portion controls light quantity of the illumination light of each spectral component by the number of luminous bodies being selected among the plurality of luminous bodies respectively emitting light which has the same spectral components, and further allows each of the plurality of luminous bodies to conduct the pulse light emission in a short period by which an observer recognizes the color of the illumination light illuminating the illumination target area as a color obtained by mixing colors of the light emitted from the selected luminous bodies.

2. The illumination apparatus according to claim 1, wherein the luminous body drive portion controls quantity of the light emitted from the plurality of luminous bodies, in accordance with the color of the illumination light set by the illumination color setting portion.

3. The illumination apparatus according to claim 2, wherein the luminous body drive portion controls quantity of the light emitted from the plurality of luminous bodies, by increasing or decreasing number of the luminous bodies emitting the light, of the plurality of luminous bodies.

4. The illumination apparatus according to claim 2, wherein the luminous body drive portion controls quantity of the light emitted from the plurality of luminous bodies, by increasing or decreasing a light emission period in which each of the plurality of luminous bodies conducts the pulse light emission.

5. An image capturing apparatus, comprising:
    an illumination apparatus configured to illuminate an illumination target area observed by an operator of the apparatus with light, the illumination apparatus comprising:
        an illumination color setting portion configured to set a color of illumination light to illuminate the illumination target area; a plurality of luminous bodies configured to emit light having spectral components of different wavelength bands, respectively;
        a luminous body selection portion configured to select luminous bodies emitting the light, of the plurality of luminous bodies, in accordance with the color of the illumination light set by the illumination color setting portion; and a luminous body drive portion configured to allow each of the luminous bodies selected by the luminous body selection portion to conduct pulse light emission, wherein the plurality of luminous bodies are comprised of a plurality of luminous bodies emitting light which has the same spectral components:

the luminous body drive portion controls light quantity of the illumination light of each spectral component by the number of luminous bodies being selected among the plurality of luminous bodies respectively emitting light which has the same spectral components, and further allows each of the plurality of luminous bodies to conduct the pulse light emission in a short period by which the observer recognizes the color of the illumination light illuminating the illumination target area as a color obtained by mixing colors of the light emitted from the selected luminous bodies;

an image sensor on which an image of a subject is formed by an image capturing lens; and an exposure control portion configured to give an instruction of an exposure operation to the image sensor and conduct exposure, wherein the luminous body drive portion allows all of the selected luminous bodies to emit light sequentially in time division in a period in which the exposure control portion conducts the exposure.

* * * * *